(12) United States Patent
Miyamoto et al.

(10) Patent No.: US 6,631,142 B2
(45) Date of Patent: *Oct. 7, 2003

(54) DELAY CORRECTION SYSTEM FOR WIRELESS TELEPHONE SYSTEM

(75) Inventors: Shoichi Miyamoto, Kawasaki (JP); Yasuo Tanishima, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/503,705

(22) Filed: Feb. 14, 2000

(65) Prior Publication Data

US 2001/0040879 A1 Nov. 15, 2001

(30) Foreign Application Priority Data

Mar. 17, 1999 (JP) ............................................ 11-071773

(51) Int. Cl.[7] ................................. H04J 3/00; H04J 3/06
(52) U.S. Cl. ........................ 370/508; 370/337; 370/350
(58) Field of Search .............................. 370/350, 519, 370/517, 503, 508, 509, 512, 337, 336, 335, 347; 375/354, 365, 371; 455/525, 502, 524, 67.1, 423, 522

(56) References Cited

U.S. PATENT DOCUMENTS

| | | | | | |
|---|---|---|---|---|---|
| 4,653,049 A | * | 3/1987 | Shinmyo | .................... | 370/449 |
| 5,199,031 A | * | 3/1993 | Dahlin | ....................... | 370/350 |
| 5,509,016 A | * | 4/1996 | Muller | ........................ | 370/350 |
| 5,640,396 A | * | 6/1997 | Cudak et al. | ............... | 370/337 |
| 5,640,679 A | * | 6/1997 | Lundqvist et al. | .......... | 370/337 |
| 5,802,044 A | * | 9/1998 | Baum et al. | ................ | 370/330 |
| 5,912,886 A | * | 6/1999 | Takahashi et al. | .......... | 370/350 |
| 5,987,023 A | * | 11/1999 | Albrow et al. | .............. | 370/350 |
| 6,014,376 A | * | 1/2000 | Abreu et al. | ................ | 370/350 |
| 6,016,322 A | * | 1/2000 | Goldman | .................... | 370/508 |
| 6,031,828 A | * | 2/2000 | Koro et al. | ................. | 370/336 |
| 6,070,085 A | * | 5/2000 | Bender et al. | ............. | 455/522 |
| 6,094,168 A | * | 7/2000 | Duffett-Smith et al. | ..... | 342/463 |
| 6,112,100 A | * | 8/2000 | Ossoinig et al. | ........... | 455/502 |
| 6,151,311 A | * | 11/2000 | Wheatley, III et al. | ..... | 370/335 |
| 6,353,412 B1 | * | 3/2002 | Soliman | ..................... | 455/422 |
| 6,388,997 B1 | * | 5/2002 | Scott | .......................... | 370/280 |
| 6,493,540 B1 | * | 12/2002 | Suzuki | ...................... | 455/67.1 |

FOREIGN PATENT DOCUMENTS

| | | |
|---|---|---|
| JP | 63-202149 | 8/1988 |
| JP | 7-193859 | 7/1995 |
| JP | 9-9347 | 1/1997 |

* cited by examiner

Primary Examiner—Kwang Bin Yao
Assistant Examiner—Hanh Nguyen
(74) Attorney, Agent, or Firm—Katten Muchin Zavis Rosenman

(57) ABSTRACT

A delay correction system is used for a wireless telephone system in which a base station apparatus and at least one subscriber apparatus carry out transmitting and receiving operations via respective communication means, in conformance with a time division multiple access (TDMA) system using the base station apparatus as a synchronization reference. The delay correction system includes a measuring instruction input unit for inputting a delay measuring instruction which instructs a delay measurement, a delay measuring unit for measuring a delay quantity between the base station apparatus and the subscriber apparatus, and a first timing adjusting unit, provided in the subscriber apparatus, for receiving transmitting information which is to be sent to the base station apparatus at an allocated time slot, and for adjusting a timing of the transmitting information depending on the delay quantity before sending the transmitting information.

27 Claims, 22 Drawing Sheets

DELAY CORRECTION SYSTEM FOR WIRELESS TELEPHONE SYSTEM

BACKGROUND OF THE INVENTION

1. Field of the Invention

The present invention generally relates to delay correction systems, and more particularly to a delay correction system for a wireless telephone system which employs time division multiple access (TDMA), designed to provide a wireless telephone service in a sparsely populated region which is distant from a densely populated region.

Recently, telephone services are essential for everyday life, and there are demands to expand the range of the telephone services to the sparsely populated regions which are distant from the densely populated regions.

In an extremely sparsely populated region, it is not realistic to construct a wired network as in the case of the densely populated region. For this reason, there are expectations to apply the TDMA wireless telephone system to such an extremely sparsely populated region.

2. Description of the Related Art

FIG. 1 is a system block diagram showing an example of a TDMA wireless telephone system. In FIG. 1, a base station apparatus 410 is coupled to a base station control apparatus 401 via an integrated services digital network (ISDN) interface 411. Further, the base station apparatus 410 is coupled to an existing network via the base station control apparatus 401.

In addition, a maintenance management system 402 shown in FIG. 1 is coupled via a communication line to each base station control apparatus 401 which is set in a maintenance management area. Hence, the maintenance management system 402 centrally manages each base station control apparatus 401 and each base station apparatus 410 coupled thereto.

In the base station apparatus 410, a TDMA LSI 412 extracts information of each channel forming the TDMA frame received via a transmission and reception processor 413, and sends the extracted information to the base station control apparatus 401 via the ISDN interface 411. In addition, the TDMA LSI 412 inserts the information of each channel received via the ISDN interface 411 into the TDMA frame, and sends the TDMA frame via the transmission and reception processor 413.

A control channel analyzer 414 analyzes control channel information received from the ISDN interface 411 and the TDMA LSI 412. Based on an analysis result of the control channel analyzer 414, a base station control processor 415 controls the operation of the TDMA LSI 412.

On the other hand, in a subscriber apparatus 424 shown in FIG. 1, a TDMA LSI 421 controls the exchange of information between a speech converter 422 and a transmission and reception processor 423 in conformance with the TDMA system, similarly as in the case of the control carried out by the TDMA LSI 412 described above.

A subscriber control processor 424 controls the operation of the TDMA LSI 421 depending on an analysis result of a control channel analyzer 425 which operates similarly to the control channel analyzer 414 described above.

According to the TDMA system, 1 frame period is divided into a transmission period made up of time slots TS1 through TS4, and a reception period made up of time slots TS1 through TS4, as shown in FIG. 2. A plurality of subscriber apparatuses 420 carry out the transmission and reception operations using the base station apparatus 410 as the synchronization reference, and use the allocated time slots to communicate with the base station apparatus 410.

For example, suppose that a time slot 1 (TS1) is allocated to a subscriber apparatus 1 and a time slot 2 (TS2) is allocated to a subscriber apparatus 2. In this case, if the base station apparatus 410 sends transmitting information S1 addressed to the subscriber apparatus 1 at the timing of the time slot 1 of the transmission period on one hand, and sends transmitting information S2 addressed to the subscriber apparatus 2 at the timing of the time slot 2 of the transmission period, the transmitting information S1 is received by the subscriber apparatus 1 as received information R1 and the transmitting information S1 is received by the subscriber apparatus 2 as received information R2.

In addition, in this case, the base station apparatus 410 simply needs to receive, as the information from the subscriber apparatus 1, the received information R1 which is received at the timing of the time slot 1 of the reception period, and to receive, as the information from the subscriber apparatus 2, the received information R2 which is received at the timing of the time slot 2, and process the received information.

The information exchanged between the base station apparatus 410 and the subscriber apparatus 420 has a structure shown in FIG. 3, for example. In FIG. 3, a start symbol (SS), a control signal (CAC), a unique word (UW) and an error check code (CRC) are sandwiched between 4-bit ramp bits (R) and 16-bit guard bits (G).

When applying the TDMA wireless telephone system to the region in which the base station apparatuses are set at a high density, as in the case of a metropolitan region, there is virtually no transmission delay between the base station apparatus 410 and the subscriber apparatus 420. Hence, the transmission delay can be absorbed sufficiently by the ramp bits and the guard bits described above, and it is possible to realize a normal communication.

On the other hand, when applying the wireless telephone system to the sparsely populated region, it is necessary to enlarge the area covered by (area coverage of) each base station apparatus.

However, according to the conventional wireless telephone system described above was developed in a direction so as to reduce the cell size in order to improve the frequency band utilization efficiency in the metropolitan area or the like. In other words, it is a precondition that the base station apparatus 410 covers an area in a relatively limited range, and no consideration was given as to the transmission delay generated between the base station apparatus 410 and the subscriber 420.

For this reason, when the conventional wireless telephone system is applied as it is to the sparsely populated region, the area coverage of the base station apparatus 410 becomes limited to a range in which the ramp bits and the guard bits can absorb the transmission delay.

Suppose that the subscriber apparatus 1 is distant from the base station apparatus 410 and the subscriber apparatus 2 is close to the base station apparatus 410, as shown in FIG. 4. Further, suppose that the time slot 1 (TS1) is allocated for the distant subscriber apparatus 1, and the time slot 2 (TS2) is allocated for the close subscriber apparatus 2, as shown in FIG. 5. In this case, because of the transmission delay between the subscriber apparatus 1 and the base station apparatus 410, the information transmitted from the subscriber apparatus 1 at the transmitting timing (TS1) and the information transmitted from the subscriber apparatus 2 at the transmitting timing (TS2) interfere during the reception period of the base station apparatus 410 as indicated by the hatching in FIG. 5.

As a technique for preventing the interference caused by the transmission delay, there is a proposed method which uses a remote type subscriber apparatus for the subscriber apparatus which is located at a distant location from the base station apparatus.

FIG. 6 is a system block diagram showing the construction of the remote type subscriber apparatus. In the remote type subscriber apparatus shown in FIG. 6, the TDMA LSI 421 is designed to supply the transmitting information to the transmission and reception processor 423 via a timing adjuster 431. The timing adjuster 431 adjusts the timing of the transmitting information to become advanced by a time corresponding to a symbol number n specified by a symbol number setting unit 432.

In other words, the timing adjuster 431 receives transmitting information D1 which is sent from the TDMA LSI 421 during the time slot of the transmission period at the subscriber end as shown in FIG. 15 which will be described later (FIG. 15 shows a case where a time slot TS3 is allocated). Instead of sending this transmitting information D1 as it is, the timing adjuster 431 sends the transmitting information D1 to the transmission and reception processor 423 at a timing which is advanced by n symbols during the next transmission period.

In this case, when setting the remote type subscriber apparatus, the delay quantity is estimated based on a distance from the base station apparatus 410 on a map or the like, and a symbol number corresponding to this delay quantity is set in the symbol number setting unit 432.

Thereafter, when the remote type subscriber apparatus communicates with the base station apparatus 410, it is possible to carry out a normal communication because the transmission timing is adjusted as described above.

However, according to this proposed method which uses the remote type subscriber apparatus, it is necessary to carry out the operation of setting the symbol number every time the remote type subscriber apparatus is set. In addition, it is also necessary to switch between the normal subscriber apparatus and the remote type subscriber apparatus depending on the distance from the base station apparatus.

SUMMARY OF THE INVENTION

Accordingly, it is a general object of the present invention to provide a novel and useful delay correction system for wireless telephone system, in which the problems described above are eliminated.

Another and more specific object of the present invention is to provide a delay correction system which can automatically correct a transmission delay between a subscriber apparatus and a base station apparatus in a wireless telephone system.

Still another object of the present invention is to provide a delay correction system for a wireless telephone system in which a base station apparatus and at least one subscriber apparatus carry out transmitting and receiving operations via respective communication means, in conformance with a time division multiple access (TDMA) system using the base station apparatus as a synchronization reference, where the delay correction system comprises measuring instruction input means for inputting a delay measuring instruction which instructs a delay measurement, delay measuring means for measuring a delay quantity between the base station apparatus and the subscriber apparatus, and first timing adjusting means, provided in the subscriber apparatus, for receiving transmitting information which is to be sent to the base station apparatus at an allocated time slot, and for adjusting a timing of the transmitting information depending on the delay quantity before sending the transmitting information. According to the delay correction system of the present invention, the transmission timing of the subscriber apparatus is adjusted based on the transmission delay quantity between the subscriber apparatus and the base station apparatus. For this reason, it is possible to use the same kind of subscriber apparatus regardless of the distance from the base station apparatus. In addition, it is possible to enlarge the area coverage provided by one base station apparatus, and to realize a wireless telephone system suited for a sparsely populated region. In this case, the processing load on the base station apparatus can be reduced by carrying out the delay correcting operation in the subscriber apparatus, thereby making the delay correction system suited for use in a wireless telephone system in which the subscriber apparatus is connected to a data line.

A further object of the present invention is to provide a delay correction system for a wireless telephone system in which a base station apparatus and at least one subscriber apparatus carry out transmitting and receiving operations via respective communication means, in conformance with a time division multiple access (TDMA) system using the base station apparatus as a synchronization reference, where the delay correction system comprises measuring instruction input means for inputting a delay measuring instruction which instructs a delay measurement, delay measuring means for measuring a delay quantity between the base station apparatus and the subscriber apparatus, and time slot correcting means, provided in the base station apparatus, adjusting a time position of a signal received from the subscriber apparatus depending on the delay quantity, and moving the time position of the received signal to an appropriate time slot. According to the delay correction system of the present invention, the reception time slot position is corrected in the base station apparatus, based on the transmission delay quantity between the subscriber apparatus and the base station apparatus. For this reason, it is possible to use the same kind of subscriber apparatus regardless of the distance from the base station apparatus. In addition, it is possible to enlarge the area coverage provided by one base station apparatus, and to realize a wireless telephone system suited for a sparsely populated region. In this case, the processing load on the subscriber apparatus can be reduced by carrying out the delay correcting operation in the base station apparatus, thereby making the delay correction system suited for use in a wireless telephone system for mobile terminals.

Another object of the present invention is to provide a delay correction system for a wireless telephone system in which a base station apparatus and at least one subscriber apparatus carry out transmitting and receiving operations, in conformance with a time division multiple access (TDMA) system using the base station apparatus as a synchronization reference, where the subscriber apparatus comprises communication means for transmitting and receiving signals with respect to the base station apparatus, communication control means for controlling the operation of the communication means in conformance with the TDMA system, second timing adjusting means for receiving transmitting information which is to be sent to the base station apparatus and adjusting a transmission timing depending on an adjusting value which is specified by an input adjusting instruction, establishment request means for repeatedly instructing the communication control means that a link channel establish request is issued, transmission timing search means, which starts to operate depending on a transmission of the link channel establish request by the communication control means, for changing the adjusting value depending on whether or not the communication means received a response corresponding to the link channel establish request, and for transmitting the adjusting instruction which specifies the adjusting value to the second timing adjusting means, and channel allocation monitoring means for monitoring exchange of signals between the communication means and the base station apparatus, and stopping an operation of the establishment request means depending on a detection of a response corresponding to the link channel establish request. According to the delay correction system of the present invention, the subscriber apparatus automatically searches for an appropriate transmission timing depending on whether or not a response is received from the base station apparatus with respect to a link channel establish request. For this reason, it is possible to use the same kind of subscriber apparatus regardless of the distance from the base station apparatus. In addition, it is possible to enlarge the area coverage provided by one base station apparatus, and to realize a wireless telephone system suited for a sparsely populated region. In this case, the existing base station apparatus can be used as it is, because the transmission timing is automatically adjusted in the subscriber apparatus.

Other objects and further features of the present invention will be apparent from the following detailed description when read in conjunction with the accompanying drawings.

DESCRIPTION OF THE PREFERRED EMBODIMENTS

Figure 7:
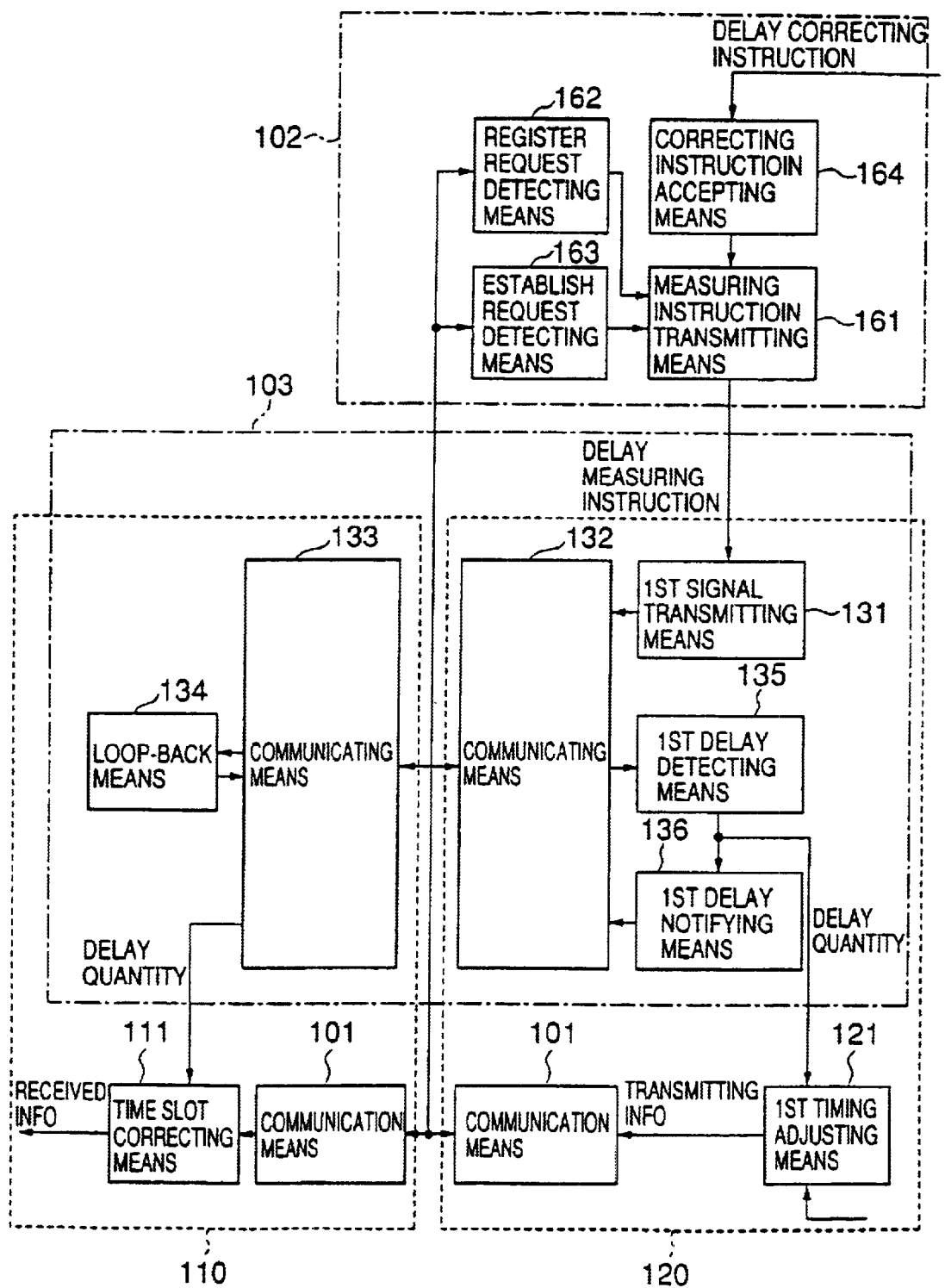
FIG. 7 is a system block diagram for explaining the operating principle of the present invention.
Figure 8:
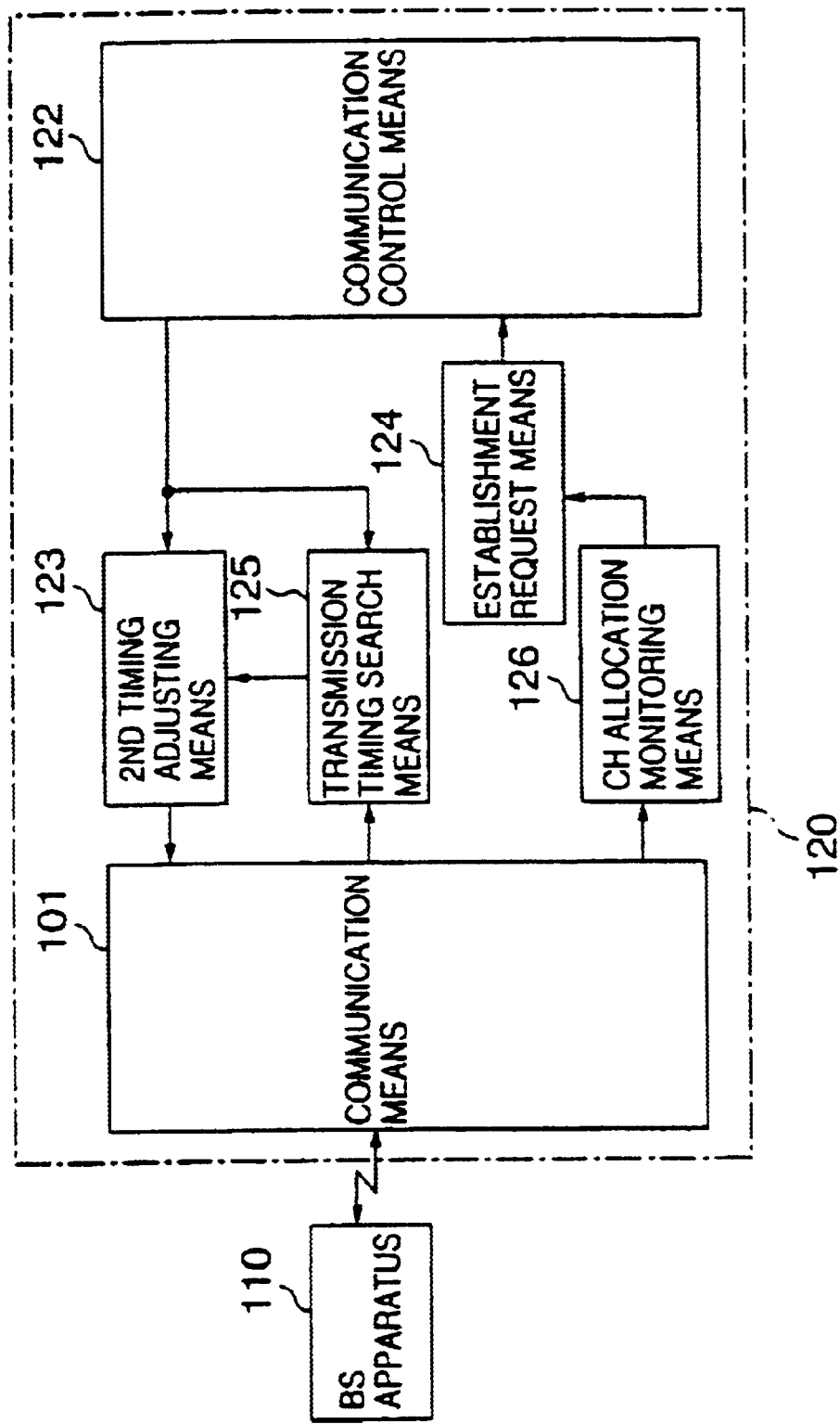
FIG. 8 is a system block diagram for explaining the operating principle of the present invention.
Figure 9:
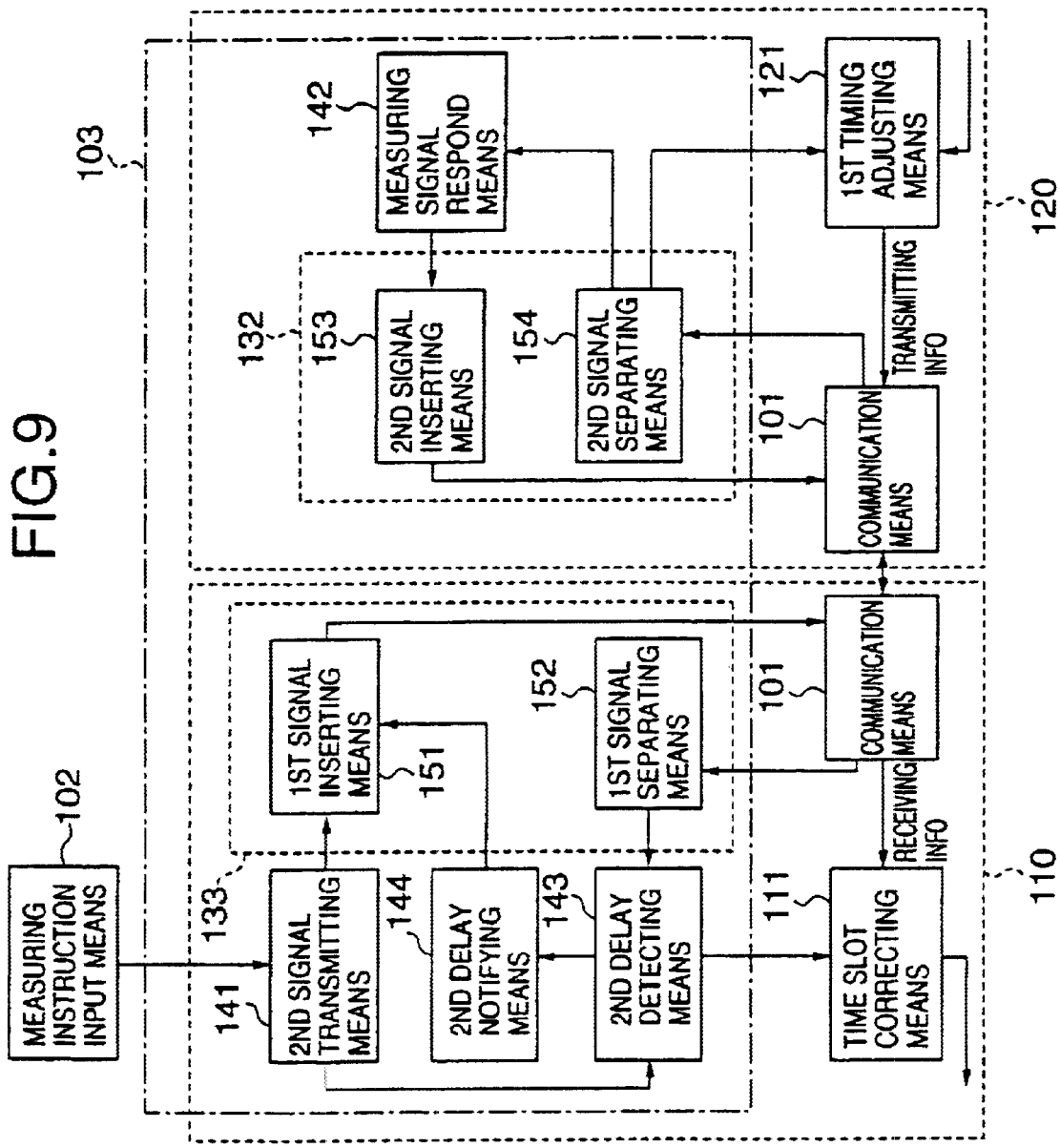
FIG. 9 is a system block diagram for explaining the operating principle of the present invention.

First, a description will be given of the operating principle of the present invention, by referring to FIGS. 7 through 9. FIGS. 7 through 9 are system block diagrams for explaining the operating principle of the present invention.

FIG. 7 shows a delay correction system for explaining first, second, fourth, fifth and ninth through twelfth aspects of the present invention.

According to the first aspect of the present invention, the delay correction system is used in a wireless telephone system in which a base station apparatus 110 and at least one subscriber apparatus 120 carry out transmitting and receiving operations via respective communication means 101, in conformance with the TDMA system using the base station apparatus 110 as a synchronization reference. The delay correction system includes a measuring instruction input means 102 for inputting a delay measuring instruction which instructs a delay measurement, a delay measuring means 103 for measuring a delay quantity between the base station apparatus 110 and the subscriber apparatus 120, and a first timing adjusting means 121 which is provided in the subscriber apparatus 120. The first timing adjusting means 121 receives transmitting information which is to be sent to the base station apparatus 110 at an allocated time slot, and adjusts the timing of the transmitting information depending on the delay quantity before sending the transmitting information.

Depending on the instruction from the measuring instruction input means 102, the delay measuring means 103 measures the transmission delay between the base station apparatus 110 and the subscriber apparatus 120. In addition, the first timing adjusting means 121 provided in the subscriber apparatus 120 operates depending on the measured delay quantity. For example, the first timing adjusting means 121 outputs the transmitting information in advance by a time corresponding to the delay quantity. Hence, the transmission delay between the base station apparatus 110 and the subscriber apparatus 120 is automatically corrected, and it is possible to send the transmission information in the time slot allocated for the subscriber apparatus 120 by the base station apparatus 110.

Therefore, according to the first aspect of the present invention, the transmission timing of the subscriber apparatus is adjusted based on the transmission delay quantity between the subscriber apparatus and the base station apparatus. For this reason, it is possible to use the same kind of subscriber apparatus regardless of the distance from the base station apparatus. In addition, it is possible to enlarge the area coverage provided by one base station apparatus, and to realize a wireless telephone system suited for a sparsely populated region. In this case, the processing load on the base station apparatus can be reduced by carrying out the delay correcting operation in the subscriber apparatus, thereby making the delay correction system suited for use in a wireless telephone system in which the subscriber apparatus is connected to a data line.

According to a second aspect of the present invention, the delay correction system is used in a wireless telephone system in which a base station apparatus 110 and at least one subscriber apparatus 120 carry out transmitting and receiving operations via respective communication means 101, in conformance with the TDMA system using the base station apparatus 110 as a synchronization reference. The delay correction system includes a measuring instruction input means 102 for inputting a delay measuring instruction which instructs a delay measurement, a delay measuring means 103 for measuring a delay quantity between the base station apparatus 110 and the subscriber apparatus 120, and a time slot correcting means 111 which is provided in the base station apparatus 110. The time slot correcting means 111 adjusts the time position of the signal received from the subscriber apparatus 120 depending on the delay quantity, and moves the time position of the received signal to an appropriate time slot.

Depending on the instruction from the measuring instruction input means 102, the delay measuring means 103 measures the transmission delay between the base station apparatus 110 and the subscriber apparatus 120. In addition, the time slot correcting means 111 provided in the base station apparatus 110 operates depending on the measured delay quantity. More particularly, the time slot correcting means 111 moves the time position of the received signal to the time slot allocated for the subscriber apparatus 120. As a result, the transmission delay between the base station apparatus 110 and the subscriber apparatus 120 is automatically corrected, and in the base station apparatus 110, it is possible to process the received information from the subscriber apparatus 120 as information in the prescribed time slot.

Therefore, according to the second aspect of the present invention, the reception time slot position is corrected in the base station apparatus, based on the transmission delay quantity between the subscriber apparatus and the base station apparatus. For this reason, it is possible to use the same kind of subscriber apparatus regardless of the distance from the base station apparatus. In addition, it is possible to enlarge the area coverage provided by one base station apparatus, and to realize a wireless telephone system suited for a sparsely populated region. In this case, the processing load on the subscriber apparatus can be reduced by carrying out the delay correcting operation in the base station apparatus, thereby making the delay correction system suited for use in a wireless telephone system for mobile terminals.

FIG. 8 shows a delay correction system for explaining a third aspect of the present invention.

According to the third aspect of the present invention, the delay correction system is used in a wireless telephone system in which a base station apparatus 110 and at least one subscriber apparatus 120 carry out transmitting and receiving operations, in conformance with the TDMA system using the base station apparatus 110 as a synchronization reference. The subscriber apparatus 120 includes a communication means 101 for transmitting and receiving signals with respect to the base station apparatus 110, a communication control means 122 for controlling the operation of the communication means 101 in conformance with the TDMA system, a second timing adjusting means 123 for receiving transmitting information which is to be sent to the base station apparatus 110 and adjusting a transmission timing depending on an adjusting value which is specified by an input adjusting instruction, an establishment request means 124 for repeatedly instructing the communication control means 122 that a link channel (LCH) establish request is issued, a transmission timing search means 125, and a channel allocation monitoring means 126. The transmission timing search means 125 starts to operate depending on the transmission of the link channel establish request by the communication control means 122, and changes the adjusting value depending on whether or not the communication means 101 received a response corresponding to the link channel establish request. The transmission timing search means 125 transmits the adjusting instruction which specifies this adjusting value to the second timing adjusting means 123. The channel allocation monitoring means 126 monitors the exchange of signals between the communication means 101 and the base station apparatus 110, and stops the operation of the establishment request means 124 depending on the detection of the response corresponding to the link channel establish request.

The transmission timing search means 125 operates repeatedly depending on the link channel establish request from the establishment request means 124. Hence, it is possible to automatically search for an adjusting value appropriate for the transmission delay between the subscriber apparatus 120 and the base station apparatus 110.

Therefore, a link channel allocation is made, and when the operation of the establishment request means 124 is stopped by the channel allocation monitoring means 126, the appropriate adjusting value is instructed to the second timing adjusting means 123. Hence, by adjusting the transmission timing of the transmitting information from the communication control means 122 depending on the adjusting value, it is possible to correct the transmission delay between the base station apparatus 110 and the subscriber apparatus 120, and to transmit the transmitting information in the time slot allocated for the subscriber apparatus 120 by the base station apparatus 110.

Therefore, according to the third aspect of the present invention, the subscriber apparatus automatically searches for an appropriate transmission timing depending on whether or not a response is received from the base station apparatus with respect to a link channel establish request. For this reason, it is possible to use the same kind of subscriber apparatus regardless of the distance from the base station apparatus. In addition, it is possible to enlarge the area coverage provided by one base station apparatus, and to realize a wireless telephone system suited for a sparsely populated region. In this case, the existing base station apparatus can be used as it is, because the transmission timing is automatically adjusted in the subscriber apparatus.

According to a fourth aspect of the present invention, in the delay correction system according to the first aspect of the present invention, the delay measuring means 103 includes a first signal transmitting means 131, a subscriber end measuring signal communicating means 132, a base station end measuring signal communicating means 133, a loop-back means 134, and a first delay detecting means 135, as shown in FIG. 7. The first signal transmitting means 131 is provided in the subscriber apparatus 120, and transmits a measuring signal which is used as a reference when measuring the delay quantity, depending on the delay measuring instruction from the measuring instruction input means 102. The subscriber end measuring signal communicating means 132 is provided in the subscriber apparatus 120, and exchanges the measuring signal with the base station apparatus 110. On the other hand, the base station end measuring signal communicating means 133 is provided in the base station apparatus 110, and exchanges the measuring signal with the subscriber apparatus 120. The loop-back means 134 is provided in the base station apparatus 110, and loops back the measured signal which is received via the base station end measuring signal communicating means 133 after a predetermined time, as a response signal to the subscriber apparatus 120. The first delay detecting means 135 is provided in the subscriber apparatus 120, and detects the delay quantity of the transmission delay between the subscriber apparatus 120 and the base station apparatus 110, based on an error between a timing at which the response signal should be received and a timing at which the response signal is actually received from the subscriber end measuring signal communicating means 132. The first timing adjusting means 121 adjusts the transmission timing based on the delay quantity which is received from the first delay detecting means 135.

The loop-back means 134 provided in the base station apparatus 110 and the first signal transmitting means 131 and the first delay detecting means 135 provided in the subscriber apparatus 120 exchange the measuring signals via the base station end measuring signal communicating means 133 and the subscriber end measuring signal communicating means 132. Hence, it is possible to automatically measure the transmission delay between the base station apparatus 110 and the subscriber apparatus 120 based on the reception timing of the measuring signals, and to use the measured transmission delay when carrying out the process in the first timing adjusting means 121.

Therefore, according to the fourth aspect of the present invention, the delay measuring operation and the delay correcting operation are centrally carried out by the subscriber apparatus. Hence, the processing load on the base station apparatus can be reduced.

According to a fifth aspect of the present invention, in the delay correction system according to the second aspect of the present invention, the delay measuring means 103 includes a first signal transmitting means 131, a subscriber end measuring signal communicating means 132, a base station end measuring signal communicating means 133, a loop-back means 134, a first delay detecting means 135, and a first delay notifying means 136, as shown in FIG. 7. The first signal transmitting means 131 is provided in the subscriber apparatus 120, and transmits a measuring signal which is used as a reference when measuring the delay quantity, depending on the delay measuring instruction from the measuring instruction input means 102. The subscriber end measuring signal communicating means 132 is provided in the subscriber apparatus 120, and exchanges the measuring signal with the base station apparatus 110. On the other hand, the base station end measuring signal communicating means 133 is provided in the base station apparatus 110, and exchanges the measuring signal with the subscriber apparatus 120. The loop-back means 134 is provided in the base station apparatus 110, and loops back the measured signal which is received via the base station end measuring signal communicating means 133 after a predetermined time, as a response signal to the subscriber apparatus 120. The first delay detecting means 135 is provided in the subscriber apparatus 120, and detects the delay quantity of the transmission delay between the subscriber apparatus 120 and the base station apparatus 110, based on an error between a timing at which the response signal should be received and a timing at which the response signal is actually received from the subscriber end measuring signal communicating means 132. The time slot correcting means 111 receives the delay information from the base station end measuring signal communicating means 133, and adjusts the time position of the received signal.

The loop-back means 134 provided in the base station apparatus 110 and the first signal transmitting means 131 and the first delay detecting means 135 provided in the subscriber apparatus 120 exchange the measuring signals via the base station end measuring signal communicating means 133 and the subscriber end measuring signal communicating means 132. Hence, it is possible to automatically measure the transmission delay between the base station apparatus 110 and the subscriber apparatus 120 based on the reception timing of the measuring signals. In addition, by notifying the measured delay quantity to the base station apparatus 110 from the first delay notifying means 136 via the subscriber end measuring signal communicating means 132, the notified delay quantity is used when carrying out the process in the time slot correcting means 111.

Therefore, according to the fifth aspect of the present invention, the delay measuring operation is carried out by the subscriber apparatus. Hence, the processing load on the base station apparatus can be reduced.

FIG. 9 shows a delay correction system for explaining sixth through eighth operating principles of the present invention.

According to the sixth aspect of the present invention, inn the delay correction system according to the first aspect of the present invention, the delay measuring means 103 includes a second signal transmitting means 141, a base station end measuring signal communicating means 133, a subscriber end measuring signal communicating means 132, a measuring signal respond means 142, a second delay detecting means 143, and a second delay notifying means 144. The second signal transmitting means 141 is provided in the base station apparatus 110, and transmits a measuring signal which is used as a reference when measuring the delay quantity, depending on the delay measuring instruction from the measuring instruction input means 102. The base station end measuring signal communicating means 133 is provided in the base station apparatus 110, and exchanges a measuring signal with the subscriber apparatus 120. The subscriber end measuring signal communicating means 132 is provided in the subscriber apparatus 120, and exchanges a measuring signal with the base station apparatus 110. The measuring signal respond means 142 is provided in the subscriber apparatus 120, and transmits the measuring signal to the base station apparatus 110 via the subscriber end measuring signal communicating means 132 in a time slot allocated for the subscriber apparatus 120. The second delay detecting means 143 is provided in the base station apparatus 110, and detects the delay quantity of the transmission delay between the subscriber apparatus 120 and the base station apparatus 110, based on an error between a timing at which a response signal with respect to the measuring signal should be received and a timing at which the response signal is actually transmitted by the measuring signal respond means 142. The second delay notifying means 144 is provided in the base station apparatus 110, and transmits delay information which indicates the delay quantity detected by the second delay detecting means 143 to the subscriber apparatus 120 via the base station end measuring signal communicating means 133. The first timing adjusting means 121 adjusts the transmission timing based on the delay quantity which is indicated by the delay information received from the subscriber end measuring signal communicating means 132.

The second signal transmitting means 141 and the second delay detecting means 143 provided in the base station apparatus 110 and the measuring signal respond means 142 provided in the subscriber apparatus 120 exchange the measuring signals via the base station end measuring signal communicating means 133 and the subscriber end measuring signal communicating means 132. Hence, the transmission delay between the base station apparatus 110 and the subscriber apparatus 120 can be measured automatically, based on an error between the reception timings of the measuring signals. By notifying the measured delay quantity from the second delay notifying means 144 to the subscriber apparatus 120 via the base station end measuring signal communicating means 133, the measured delay quantity can be used when carrying out the process in the first timing adjusting means 121.

Therefore, according to the sixth aspect of the present invention, the delay measuring operation is carried out by the base station apparatus. Hence, the processing load on the subscriber apparatus can be reduced.

According to the seventh aspect of the present invention, in the delay correction system according to the second aspect of the present invention, the delay measuring means 103 includes a second signal transmitting means 141, a base station end measuring signal communicating means 133, a subscriber end measuring signal communicating means 132, a measuring signal respond means 142, and a second delay detecting means 143. The second signal transmitting means 141 is provided in the base station apparatus 110, and transmits a measuring signal which is used as a reference when measuring the delay quantity, depending on the delay measuring instruction from the measuring instruction input means 102. The base station end measuring signal communicating means 133 is provided in the base station apparatus 110, and exchanges a measuring signal with the subscriber apparatus 120. The subscriber end measuring signal communicating means 132 is provided in the subscriber apparatus 120, and exchanges a measuring signal with the base station apparatus 110. The measuring signal respond means 142 is provided in the subscriber apparatus 120, and transmits the measuring signal to the base station apparatus 110 via the subscriber end measuring signal communicating means 132 in a time slot allocated for the subscriber apparatus 120. The second delay detecting means 143 is provided in the base station apparatus 110, and detects the delay quantity of the transmission delay between the subscriber apparatus 120 and the base station apparatus 110, based on an error between a timing at which a response signal with respect to the measuring signal should be received and a timing at which the response signal is actually transmitted by the measuring signal respond means 142. The time slot correcting means 111 adjusts the time position of the received information, based on the delay quantity detected by the second delay detecting means 143.

The second signal transmitting means 141 and the second delay detecting means 143 provided in the base station apparatus 110 and the measuring signal respond means 142 provided in the subscriber apparatus 120 exchange the measuring signals via the base station end measuring signal communicating means 133 and the subscriber end measuring signal communicating means 132. Hence, the transmission delay between the base station apparatus 110 and the subscriber apparatus 120 can be measured automatically, based on an error between the reception timings of the measuring signals, and the measured delay quantity can be used when carrying out the process in the time slot correcting means 111.

Therefore, according to the seventh aspect of the present invention, the delay measuring operation and the delay correcting operation are centrally carried out by the base station apparatus. Hence, the processing load on the subscriber apparatus can be reduced.

According to the eighth aspect of the present invention, in the delay correction system according to any one of the fourth through seventh aspects of the present invention, the base station end measuring signal communicating means 133 includes a first signal inserting means 151 and a first signal separating means 152. The first signal inserting means 151 secures, as measuring signal transmitting channels, 2 successive time slots of the transmission period provided by the communication means 101 of the base station apparatus 110, and transmits the measuring signal in the measuring signal transmitting channels. The first signal separating means 152 secures, as measuring signal receiving channels, 2 successive time slots of the reception period provided by the communication means 101, and separates the signal received in the measuring signal receiving channels. On the other hand, the subscriber end measuring signal communicating means 132 includes a second signal inserting means 153 and a second signal separating means 154. The second signal inserting means 153 secures, as measuring signal transmitting channels, 2 successive time slots of the transmission period provided by the communication means 101 of the subscriber apparatus 120, and transmits the measuring signal in the measuring signal transmitting channels. The second signal separating means 154 secures, as measuring signal receiving channels, 2 successive time slots of the reception period provided by the communication means 101, and separates the measuring signal received in the measuring signal receiving channels.

By the operation of the first signal inserting means 151 and the first signal separating means 152 provided in the base station apparatus 110 and the second signal inserting means 153 and the second signal separating means 154 provided in the subscriber apparatus 120, it is possible to measure the delay between the base station apparatus 110 and the subscriber apparatus 120 by exchanging the measuring signals using the 2 successive communication channels provided by both the communication means 101.

Therefore, according to the eighth aspect of the present invention, the measuring signals for measuring the delay are transmitted and received using a part of the communication channels provided by the communication means which is provided in each of the subscriber apparatus and the base station apparatus. Thus, it is possible to suppress an increase in the amount of hardware which need to be additionally provided for the delay measurement.

According to the ninth aspect of the present invention, in the delay correction system according to any of the fourth through seventh aspects of the present invention, the base station end measuring signal communicating means 133 and the subscriber end measuring signal communicating means 132 communicate the measuring signals using frequency bands which are different from those used by the respective communication means 101 of the other of the base station end measuring signal communicating means 133 and the subscriber end measuring signal communicating means 132.

Therefore, by the operation of the base station end measuring signal communicating means 133 and the subscriber end measuring signal communicating means 132, it is possible to measure the transmission delay without affecting the communication channels used by the communication means 101 of the other of the base station end measuring signal communicating means 133 and the subscriber end measuring signal communicating means 132.

Hence, according to the ninth aspect of the present invention, the means for transmitting and receiving the measuring signals for measuring the delay is provided in each of the subscriber apparatus and the base station apparatus. For this reason, it is possible to measure the delay while maintaining the communication channels provided by the communication means which is provided for the speech.

According to the tenth aspect of the present invention, in the delay correction system according to the first or second aspect of the present invention, the measuring instruction input means 102 includes a measuring instruction transmitting means 161 and a register request detecting means 162. The measuring instruction transmitting means 161 transmits a delay measuring instruction depending on an input of a measuring start instruction. The register request detecting means 162 detects a position register request from the subscriber apparatus 120, and transmits the measuring start instruction to the measuring instruction transmitting means 161 in response to the position register request.

By the operation of the measuring instruction transmitting means 161 and the register request detecting means 162, it is possible to start the delay measuring operation and the delay correcting operation depending on the generation of the position register request.

Therefore, according to the tenth aspect of the present invention, the transmission delay quantity between the subscriber apparatus and the base station apparatus is measured depending on a request from the subscriber apparatus. Hence, it is possible to positively evaluate and correct the transmission delay quantity with respect to all of the subscriber apparatuses which require the delay correction.

According to the eleventh aspect of the present invention, in the delay correction system according to the first or second aspect of the present invention, the measuring instruction input means 102 includes a measuring instruction transmitting means 161 for transmitting a delay measuring instruction depending on an input of a measuring start instruction, and an establish request detecting means 163 for detecting a link channel establish request from the subscriber apparatus 120 and transmitting the measuring start instruction to the measuring instruction transmitting means 161 depending on the detection of the link channel establish request.

By the operation of the measuring instruction transmitting means 161 and the establish request detecting means 163, it is possible to start the delay measuring operation and the delay correcting operation depending on the generation of the link channel establish request.

Therefore, according to the eleventh aspect of the present invention, the transmission delay quantity between the subscriber apparatus and the base station apparatus is measured depending on a request from the subscriber apparatus. Hence, it is possible to positively evaluate and correct the transmission delay quantity with respect to all of the subscriber apparatuses which require the delay correction.

According to the twelfth aspect of the present invention, in the delay correction system according to the first or second aspect of the present invention, the measuring instruction input means 102 includes a measuring instruction transmitting means 161 for transmitting a delay measuring instruction depending on an input of a measuring start instruction, and a correcting instruction accepting means 164 for accepting an input of a delay correcting instruction and transmitting the measuring start instruction to the measuring instruction transmitting means 161 depending on the acceptance of the delay correcting instruction.

By the operation of the measuring instruction transmitting means 161 and the correcting instruction accepting means 164, it is possible to start the delay measuring operation and the delay correcting operation depending on an external delay correcting instruction, asynchronously to the operation of the wireless telephone system.

Therefore, according to the twelfth aspect of the present invention, the delay measuring operation and the delay correcting operation are carried out by accepting an external delay correcting instruction. For example, a system manager specifies a subscriber apparatus which requires the delay correction, via a maintenance management system or the like. Thus, it is possible to centrally manage the delay measuring operation and the delay correcting operation with respect to the subscriber apparatuses.

Next, description will be given of various embodiments of the delay correction system according to the present invention, by referring to FIG. 10 and the subsequent drawings.

Figure 10:
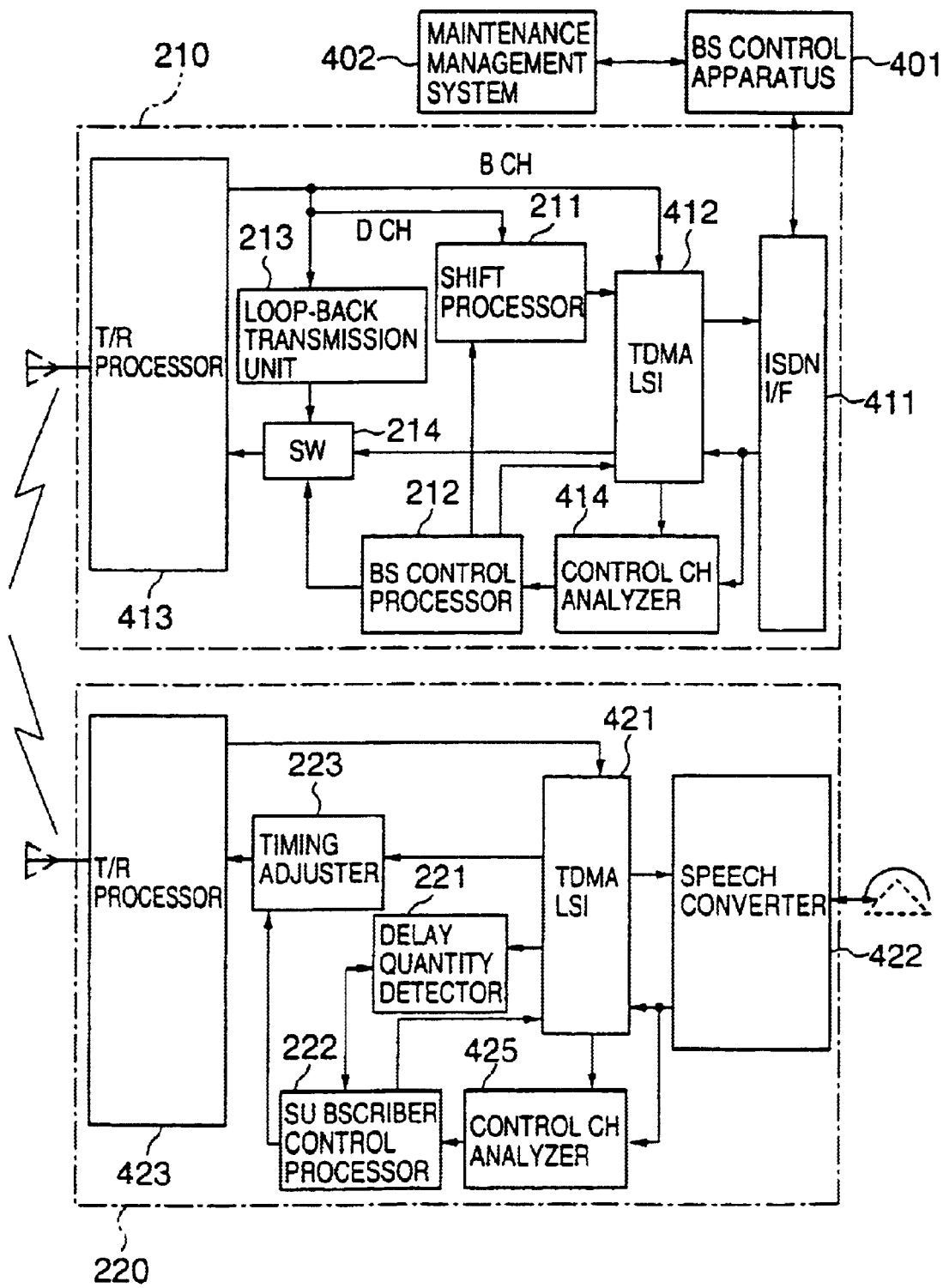
FIG. 10 is a system block diagram showing a wireless telephone system applied with a first embodiment of the delay correction system according to the present invention.

FIG. 10 is a system block diagram showing a wireless telephone system applied with a first embodiment of the delay correction system according to the present invention. A base station apparatus 210 shown in FIG. 10 includes a shift processor 211, a loop-back transmission unit 213 and a switch (SW) 214, in addition to the elements of the base station apparatus 410 shown in FIG. 1, and includes a base station control processor 212 in place of the base station control processor 415.

In the base station apparatus 210 shown in FIG. 10, the shift processor 211 receives from the transmission and reception processor 413 the received signal in the 2 successive time slots of the reception period allocated for control channels (D-channels), and carries out a shift process which will be described later. After carrying out the shift process, the shift processor 211 supplies the received signals to the TDMA LSI 412 to be processed therein.

In the base station apparatus 210, the bass station control processor 212 controls the TDMA LSI 412 based on the analysis result of the control channel analyzer 414. In addition, the base station control processor 212 secures, as the control channels, the 2 successive time slots of the reception period as described above, and controls a delay measuring process which will be described later.

Figure 5:
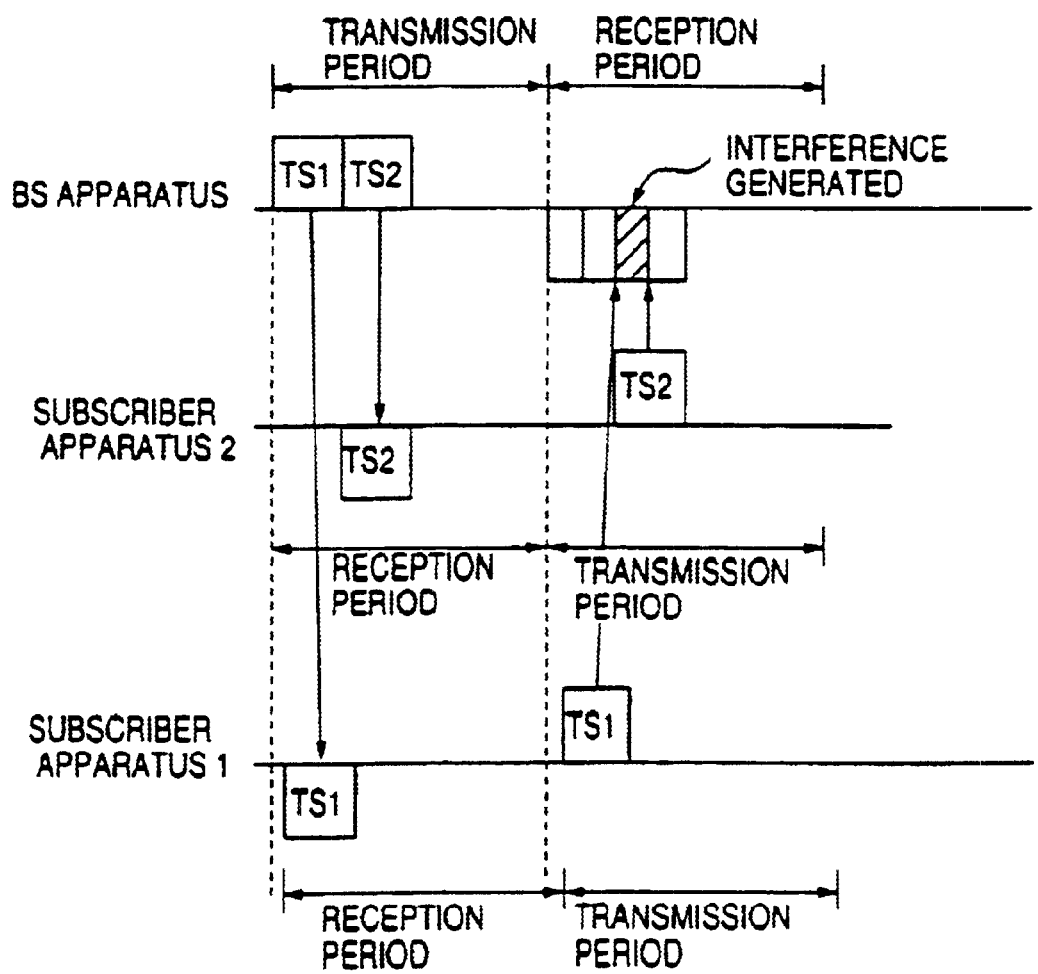
FIG. 5 is a diagram for explaining time slots allocated in a transmission period and a reception period when one subscriber apparatus is distant from the base station apparatus.

As described above, by securing the control channels amounting to 2 time slots, the received information from the subscriber apparatus 220 can be positively captured in the control channels, even when the transmission delay exists between the base station apparatus 210 and the subscriber apparatus 220 as shown in FIG. 5.

Accordingly, when the signal is received over the control channels amounting to the 2 time slots, for example, the shift processor 211 shifts the time position of the received signal based on the position of a unique word included in the received signal, for example, and shifts the received signal to the other time slot.

In addition, the loop-back transmission unit 213 shown in FIG. 10 retransmits the received signal of the control channels after ½ frame, and loops back to the side of the transmission and reception processor 413 via the switch 214. The switch 214 transmits the transmitting information from the TDMA LSI 412 or the loop-back signal from the loop-back transmission unit 213 to the transmission and reception processor 413, depending on an instruction from the base station control processor 212.

Figure 1:
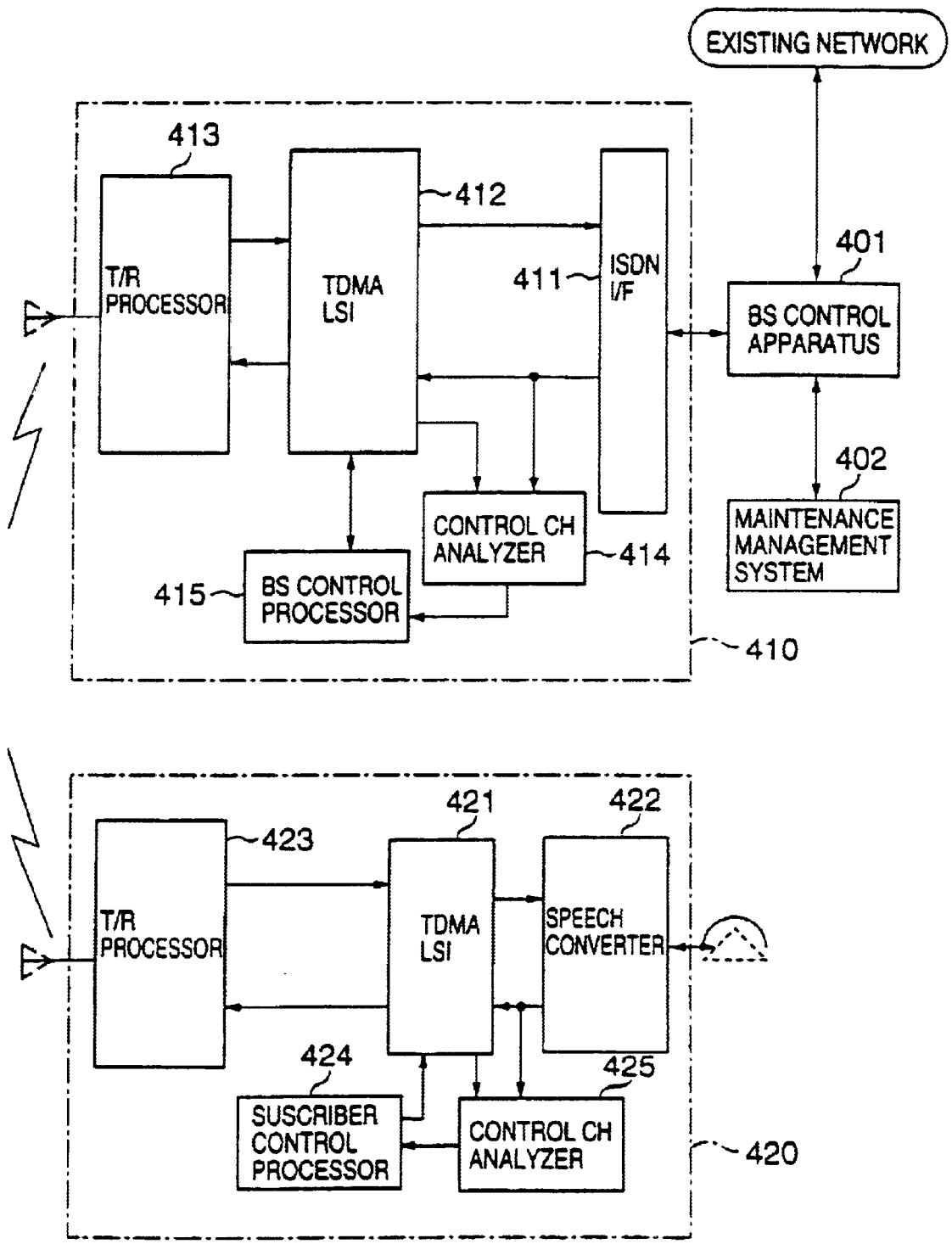
FIG. 1 is a system block diagram showing an example of a TDMA wireless telephone system.

On the other hand, in FIG. 10, the subscriber apparatus 220 includes a delay quantity detector 221 and a timing adjuster 223 in addition to the elements of the subscriber apparatus 420 shown in FIG. 1, and includes a subscriber control processor 222 in place of the subscriber control processor 424.

In the subscriber apparatus 220 shown in FIG. 10, the delay quantity detector 221 corresponds to the first delay detecting means 135 shown in FIG. 7 described above. Depending on the instruction from the subscriber control processor 222, the delay quantity detector 221 detects the delay quantity indicating the transmission delay between the subscriber apparatus 220 and the base station apparatus 210, and supplies the delay quantity to the subscriber control processor 222 to be processed therein.

Figure 6:
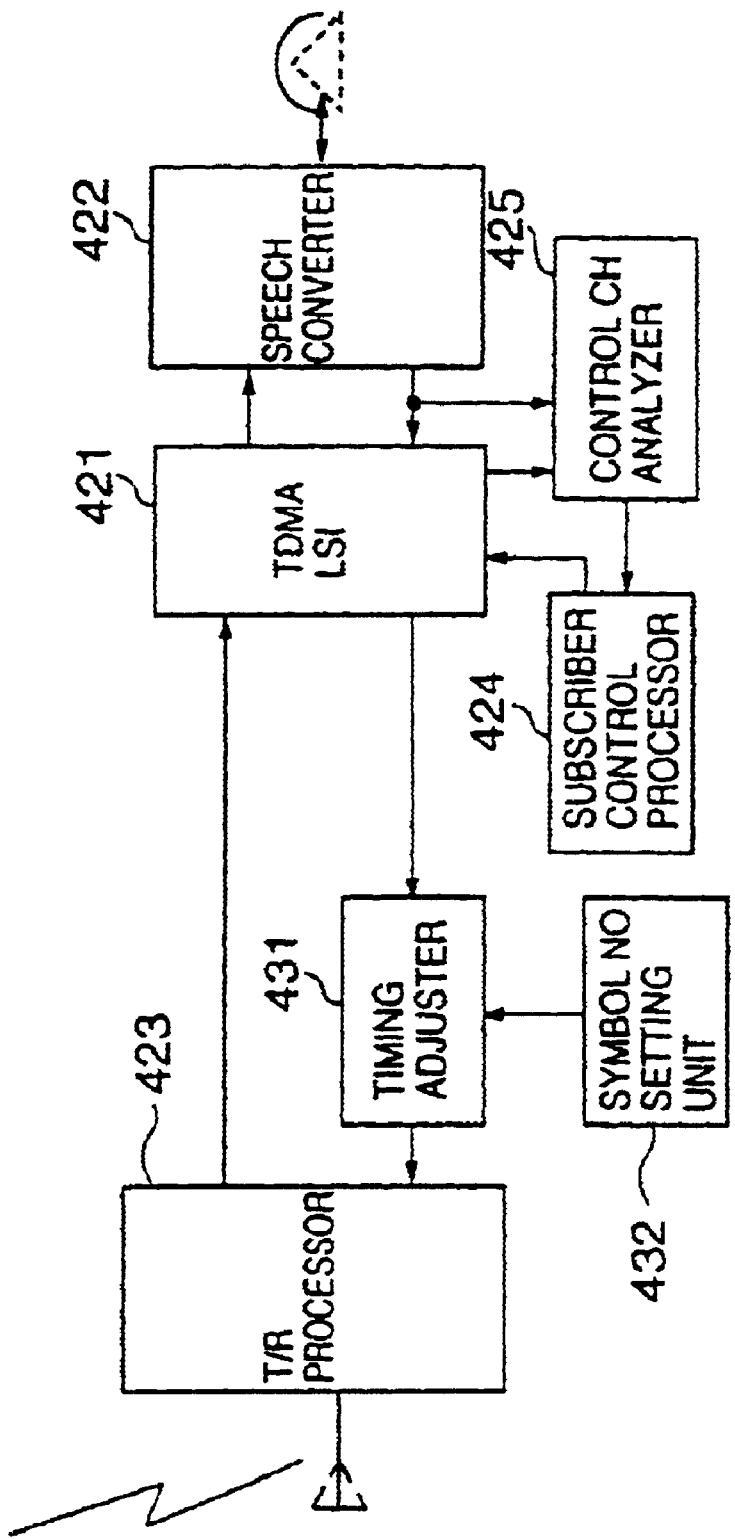
FIG. 6 is a system block diagram showing a construction of a remote type subscriber apparatus.

Moreover, in the subscriber apparatus 220, the timing adjuster 223 corresponds to the first timing adjusting means 121 shown in FIG. 7 described above. Similarly to the timing adjuster 431 shown in FIG. 6, the timing adjuster 223 outputs the transmitting information from the TDMA LSI 421 in advance by a specified number of symbols, depending on an instruction from the subscriber control processor 222, and transmits the transmitting information to the base station apparatus 210 via the transmission and reception processor 423.

Next, a description will be given of the delay measuring operation and the delay correcting operation with respect to the delay quantity, for a case where the transmission delay between the base station apparatus 210 and the subscriber apparatus 220 is to be corrected depending on a position register request from the subscriber apparatus 220.

Figure 11:
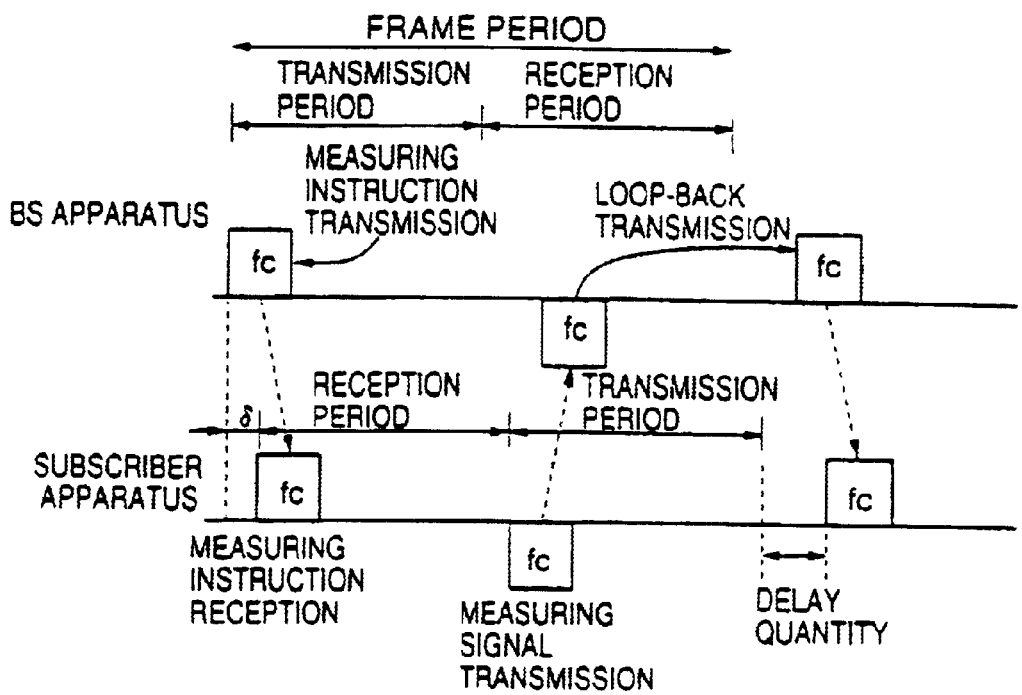
FIGS. 11 and 12 are diagrams for explaining a delay measuring operation.
Figure 12:
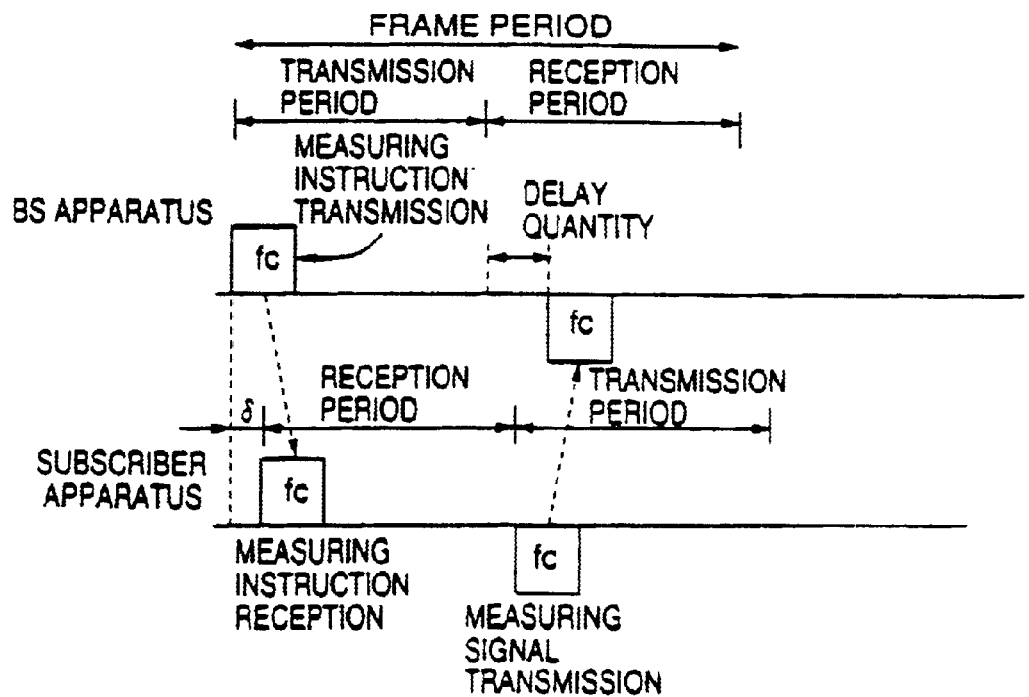
Figure 13:
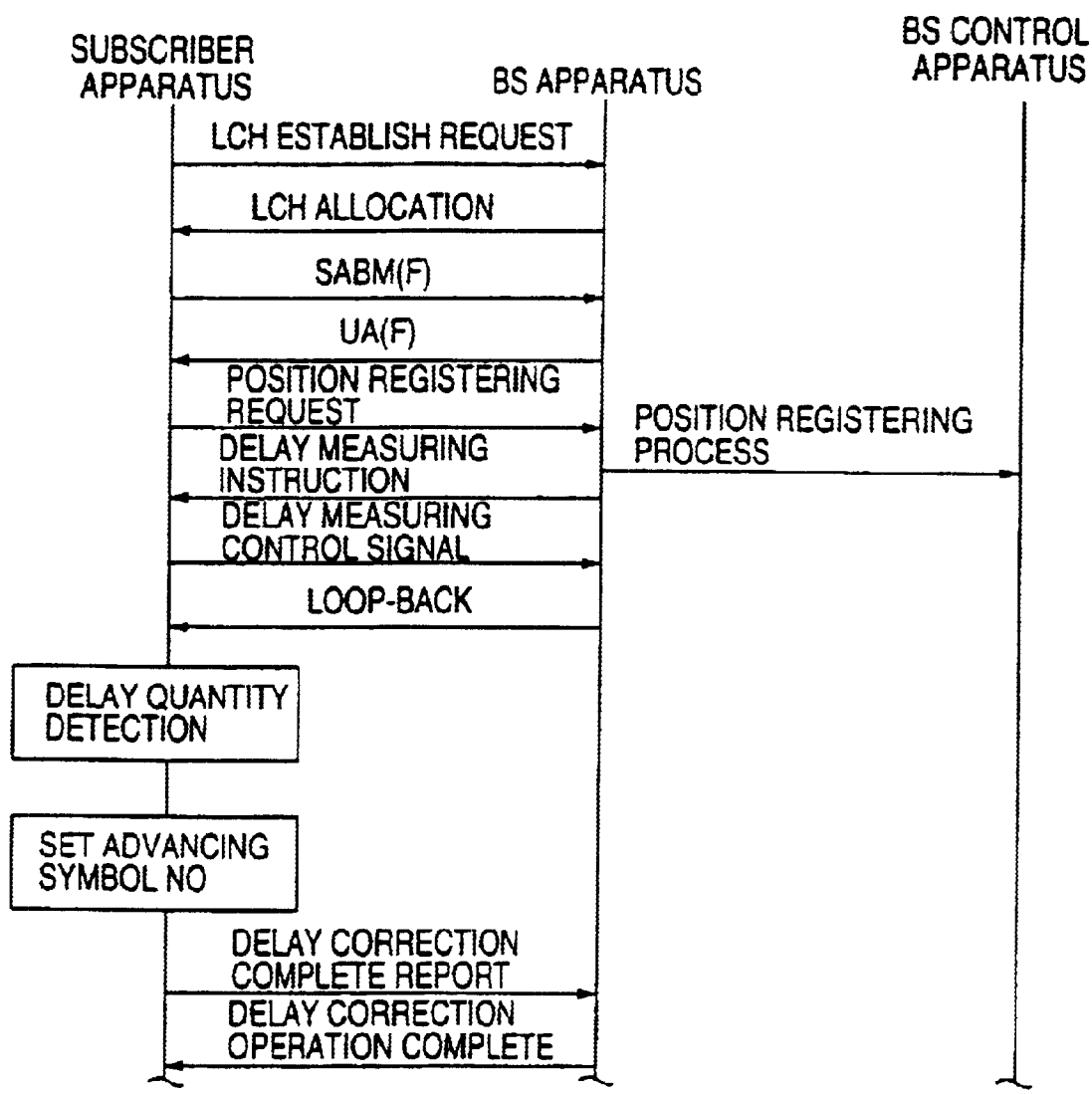
FIGS. 13 and 14 are timing charts for explaining the delay measuring operation and a delay correcting operation.
Figure 14:
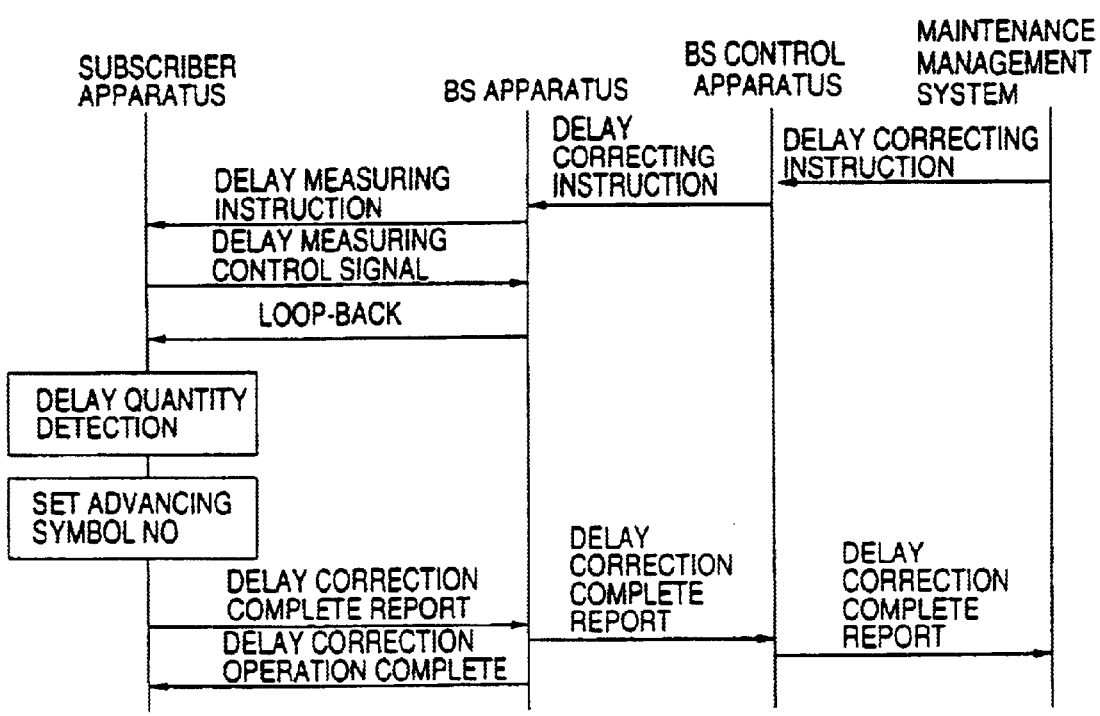
Figure 15:
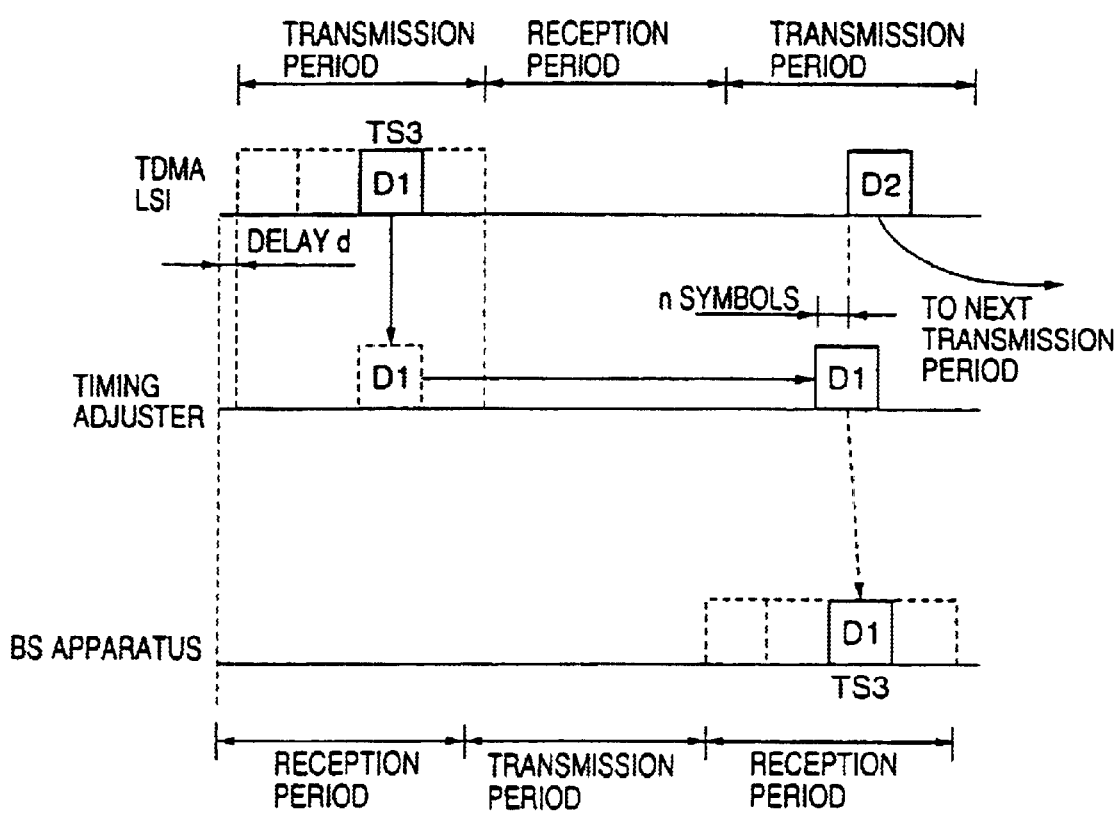
FIG. 15 is a diagram for explaining the delay correcting operation.

FIGS. 11 and 12 are diagrams for explaining the delay measuring operation. FIGS. 13 and 14 are timing charts for explaining the delay measuring operation and the delay correcting operation. In addition, FIG. 15 is a diagram for explaining the delay correcting operation.

As shown in FIG. 11 which shows a case where the measurement is made at the subscriber end, when the signals are exchanged according to a normal position registering procedure and the position register request is received from the subscriber apparatus 220, the base station control processor 212 of the base station apparatus 210 instructs transmission of control information including a predetermined control signal (fc) which indicates the delay measuring instruction to the TDMA LSI 412, depending on the analysis result of the control channel analyzer 414 shown in FIG. 10. The base station control processor 212 also instructs the switch 214 to select the transmitting information from the TDMA LSI 412.

Because the base station control processor 212 controls the TDMA LSI 412 and the switch 214 depending on the analysis result of the control channel analyzer 414, the functions of the register request detecting means 162 and the measuring instruction transmitting means 616 of the tenth aspect of the present invention described above are realized. Furthermore, it is possible to transmit the control information, which includes the predetermined control signal (fc), as the delay measuring instruction which instructs the start of the delay measurement to the subscriber apparatus 220.

In this case, the functions of the first signal inserting means 151 and the first signal separating means 152 of the eighth aspect of the present invention described above are realized by the shift processor 211, the TDMA LSI 412 and the control channel analyzer 414. Moreover, as a whole, the functions of the base station end measuring signal communicating means 133 are realized, and the measuring signals are exchanged between the base station apparatus 210 and the subscriber apparatus 220 via the transmission and reception processor 413 which corresponds to the communication means 101.

Due to the transmission delay between the base station apparatus 210 and the subscriber apparatus 220, the control information is received by the subscriber apparatus 220 after a time δ from the time when the control information is transmitted from the base station apparatus 210, as shown in FIG. 11.

In this state, the subscriber control processor 222 shown in FIG. 10 controls the TDMA LSI 421 depending on the analysis result of the control channel analyzer 425, and transmits the received control information as it is in the time slot of the transmission period allocated for the subscriber apparatus 220.

Therefore, the functions of the first signal transmitting means 131 of the fourth aspect of the present invention described above are realized by controlling the TDMA LSI 421 by the subscriber control processor 22 depending on the analysis result of the control channel analyzer 425, and it is possible to transmit the measuring signal to the base station apparatus 220 as shown in FIG. 11 depending on the input of the delay measuring instruction.

In addition, the functions of the second signal inserting means 153 and the second signal separating means 154 of the eighth aspect of the present invention described above are realized in this case by the TDMA LSI 421 and the control channel analyzer 425 shown in FIG. 10. As a whole, the functions of the subscriber end measuring signal communicating means 132 are realized, and the measuring signals are exchanged between the subscriber apparatus 220 and the base station apparatus 210 via the transmission and reception processor 423 which corresponds to the communication means 101.

Accordingly, when the measuring signal transmitted from the subscriber apparatus 220 is received by the base station apparatus 210, the base station control processor 212 instructs the switch 214 to select the output of the loop-back transmission unit 213 depending on the analysis result of the control channel analyzer 414.

By controlling the switch 214 by the base station control processor 212 depending on the analysis result of the control channel analyzer 414, it is possible to realize the functions of the loop-back means 134 of the fourth aspect of the present invention described above by the switch 214 and the loop-back transmission unit 213. In addition, it is possible to loop back and transmit the measuring signal to the subscriber apparatus 220 after ½ frame from the time when the measuring signal is received by the base station apparatus 210, as shown in FIG. 11.

In this case, the measuring signal which is looped back in the base station apparatus 220 reaches the subscriber apparatus 220 after the delay time δ described above, as shown in FIG. 11. Based on an error of the reception timing of the subscriber apparatus 220 and the reception timing of the measuring signal, the delay quantity detector 221 shown in FIG. 10 detects the delay quantity of both the up-path and the down-path between the base station apparatus 210 and the subscriber apparatus 220.

In this state, the delay quantity detector 221 measures the time from the time when a signal indicating the start timing of the reception period is received from the subscriber control processor 222 to the time when the looped back signal is received by the TDMA LSI 421. The delay quantity detector 221 supplies a measured result to the subscriber control processor 222.

As a whole, the functions of the delay measuring means 103 of the first aspect of the present invention are realized by exchanging the measuring signals between the base station apparatus 210 and the subscriber apparatus 220, and detecting by the delay quantity detector 221 of the subscriber apparatus 220 the error of the reception timing of the measuring signal looped back by the base station apparatus 210. Furthermore, it is possible to appropriately set via the subscriber control processor 222 the symbol number by which the advance output is made by the timing adjuster 223.

The subscriber control processor 222 obtains the advancing symbol number n which is necessary to cancel the delay quantity, based on the delay quantity received from the delay quantity detector 221. The advancing symbol number n is set in the timing adjuster 223.

As shown in FIG. 15, instead of transmitting the transmitting information D1 received from the TDMA LSI 421 as it is to the transmission and reception processor 423, the timing adjuster 223 transmits the transmitting information D1 at a timing which is advanced by n symbols than the timing of the time slot allocated for the subscriber apparatus 220 during the next transmission period, depending on the advancing symbol number n set in the timing adjuster 223.

Therefore, the transmitting information D1 which is output n symbols in advance is subjected to the transmission delay between when transmitted from the subscriber apparatus 220 to the base station apparatus 210, and reaches the base station apparatus 210 at the appropriate time slots of the reception period. Thus, the transmitting information D1 can be processed normally in the TDMA LSI 412 of the base station apparatus 210.

By successively transmitting the transmitting information D2, . . . of the subsequent transmission periods in a similar manner, it becomes possible to maintain the normal communication regardless of the transmission delay quantity between the subscriber apparatus 220 and the base station apparatus 210.

When the setting of the advancing symbol number n in the timing adjuster 223 is completed, the subscriber control processor 222 transmits a control signal which indicates completion of the delay correction to the base station apparatus 210 via the TDMA LSI 421, as indicated by "delay correction complete report" in FIG. 13. On the other hand, the base station control processor 212 of the base station apparatus 220 transmits a predetermined control signal which indicates completion of the delay correcting operation via the TDMA LSI 412 depending on the reception of the control signal from the subscriber control processor 222, as indicated by "delay correcting operation complete" in FIG. 13. Hence, the delay correcting operation ends, and the normal process can be continued.

Therefore, the transmission delay quantity between the subscriber apparatus 220 and the base station apparatus 210 is measured depending on the position register request, and the delay correction is made on the side of the subscriber apparatus 220 depending on the measured result. For this reason, it is possible to greatly enlarge the area coverage provided by on base station apparatus 210.

By employing the delay correction system described above in the wireless telephone system, it becomes possible to realize a wireless telephone system which can adapt to extremely sparsely populated regions.

In this case, at the time of the position registration, the correction of the transmission delay is completed, and the appropriate advancing symbol number n is set in the timing adjuster 223 of the subscriber apparatus 220. Thus, by thereafter allocating the speech channels to the subscriber apparatus 220, normal call originating, call acceptance and communication can be made.

For example, in a case where the subscriber apparatus 220 is a terminal equipment, it is always possible to made a normal communication after the position registering process is first completed. In addition, when the distance from the base station apparatus 210 changes due to moving or the like, it is simply necessary to make the position registering process again, and it is possible to use the same subscriber apparatus 220 regardless of the distance from the base station apparatus 210.

A new registration of the subscriber apparatus 220, a moving of the subscriber apparatus 220 and the like are managed by the maintenance management system 402. In the maintenance management system 402, it is possible to judge whether or not the delay correction is necessary for each subscriber apparatus 220. Hence, the maintenance management system 402 can specify the subscriber apparatus 220 and instruct the delay correcting operation to be carried out.

In this case, the maintenance management system 402 transmits specifying information which specifies the subscriber apparatus 220 which requires the delay correcting operation and a predetermined control signal which indicates the delay correcting instruction with respect to the corresponding base station apparatus 210 via the base station control apparatus 401, as shown in FIG. 14.

In this state, the control channel analyzer 414 of the base station apparatus 210 receives the above described predetermined control signal via the ISDN interface 411, and notifies the base station control processor 212 that the delay correcting instruction is received, together with the specifying information, as the analysis result. Based on this notification from the control channel analyzer 414, the base station control processor 212 transmits the predetermined control signal which indicates the delay measuring instruction to the specified subscriber apparatus 220 via the TDMA LSI 412, as shown in FIG. 14.

As a result, the delay measuring operation and the delay correcting operation are carried out as described above.

In this case, the base station control processor 212 of the base station apparatus 210 relays the delay correction complete report from the subscriber apparatus 220 to the base station control apparatus 401 and the maintenance management system 402, as shown in FIG. 14. In addition, the base station control processor 212 of the base station apparatus 210 notifies the subscriber apparatus 220 that the delay correcting operation is completed, via the TDMA LSI 412, and the delay correcting operation ends.

Accordingly, when the delay detecting operation and the delay correcting operation are distributed to the subscriber apparatus 220, it is possible to minimize the increase of the processing load on the base station apparatus 210, while at the same time enlarging the area coverage provided by the base station apparatus 210.

The delay correction system having the construction described above is particularly effective when applied to a wireless telephone system in which the subscriber apparatus 220 is a fixed terminal equipment which is connected to a data circuit.

In the wireless telephone system of this type, the delay measuring operation and the delay correcting operation described above may be carried out depending on the first transmission of the position register request or the delay correcting instruction from the maintenance management system 402, when setting up the subscriber apparatus 220. Hence, the increase in the processing load on the subscriber apparatus 220 is very small. Further, the increase in the amount of hardware of the subscriber 220 does not introduce problems.

On the other hand, it is possible to distribute the delay measuring operation to the base station apparatus 210.

Next, a description will be given of a second embodiment of the delay correction system according to the present invention, by referring to FIG. 16. This second embodiment employs the sixth and ninth aspects of the present invention described above.

Figure 16:
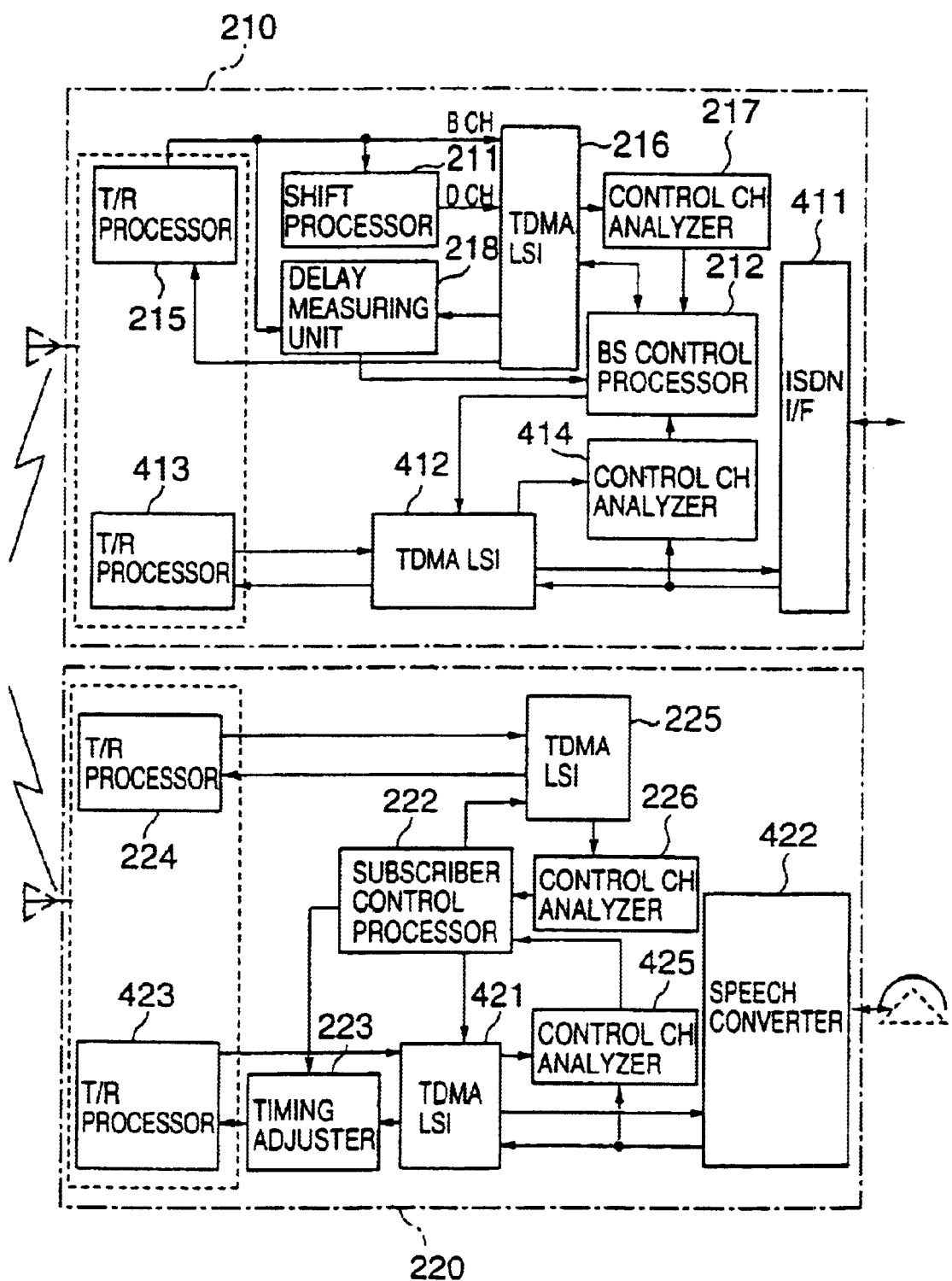
FIG. 16 is a system block diagram showing a wireless telephone system applied with a second embodiment of the delay correction system according to the present invention.

The base station apparatus 210 shown in FIG. 16 includes a measuring transmission and reception processor 215 which corresponds to the base station end measuring signal communicating means 133 of the ninth aspect of the present invention, in addition to the transmission and reception processor 413 shown in FIG. 1. This measuring transmission and reception processor 215 is constructed to transmit and receive signals in a predetermined frequency band (hereinafter referred to as a measuring frequency band) different from the frequency band of the speech channel.

In the base station apparatus 210 shown in FIG. 16, the measuring transmission and reception processor 215 and the transmission and reception processor 413 transmit and receive the signals via a common antenna.

In the base station apparatus 210 shown in FIG. 16, a TDMA LSI 216 and a control channel analyzer 217 control the signals which are transmitted and received by the measuring transmission and reception processor 215 according to the TDMA system, based on an instruction from the base station control processor 212.

The shift processor 211 of the base station apparatus 210 shown in FIG. 16 receives from the measuring transmission and reception processor 215 the received signal in 2 successive time slots of the reception period allocated for the control channels (D-channels) in the measuring frequency band. After carrying out the shift process with respect to the received signal, the shift processor 211 supplies the received signal to the TDMA LSI 216 to be processed therein.

In addition, in the base station apparatus 210 shown in FIG. 16, a delay measuring unit 218 corresponds to the second delay detecting means 143 of the sixth aspect of the present invention described above. Depending on a timing signal from the TDMA LSI 216, the delay measuring unit 218 measures a delay of the received signal due to the measuring transmission and reception processor 215, and supplies the measured delay to the base station control processor 212 to be processed therein. The timing signal will be described later.

On the other hand, in addition to the transmission and reception processor 423 shown in FIG. 1, the subscriber apparatus 220 shown in FIG. 16 includes a measuring transmission and reception processor 224 which corresponds to the subscriber end measuring signal communicating means 132 of the ninth aspect of the present invention described above. The measuring transmission and reception processor 224 is constructed to transmit and receive signals in a predetermined frequency band (measuring frequency band) different from the frequency band of the speech channel.

In the subscriber apparatus 220 shown in FIG. 16, the measuring transmission and reception processor 224 and the transmission and reception processor 423 transmit and receive the signals via a common antenna.

Moreover, in the subscriber apparatus 220 shown in FIG. 16, a TDMA LSI 225 and a control channel analyzer 226 control the signals which are transmitted and received by the measuring transmission and reception processor 224 according to the TDMA system, based on an instruction from the subscriber control processor 222.

Next, a description will be given of the delay measuring operation and the delay correcting operation which are carried out depending on a link channel establish request from the subscriber apparatus 220, in a case where the transmission delay between the base station apparatus 210 and the subscriber apparatus 220 are to be corrected.

Figure 17:
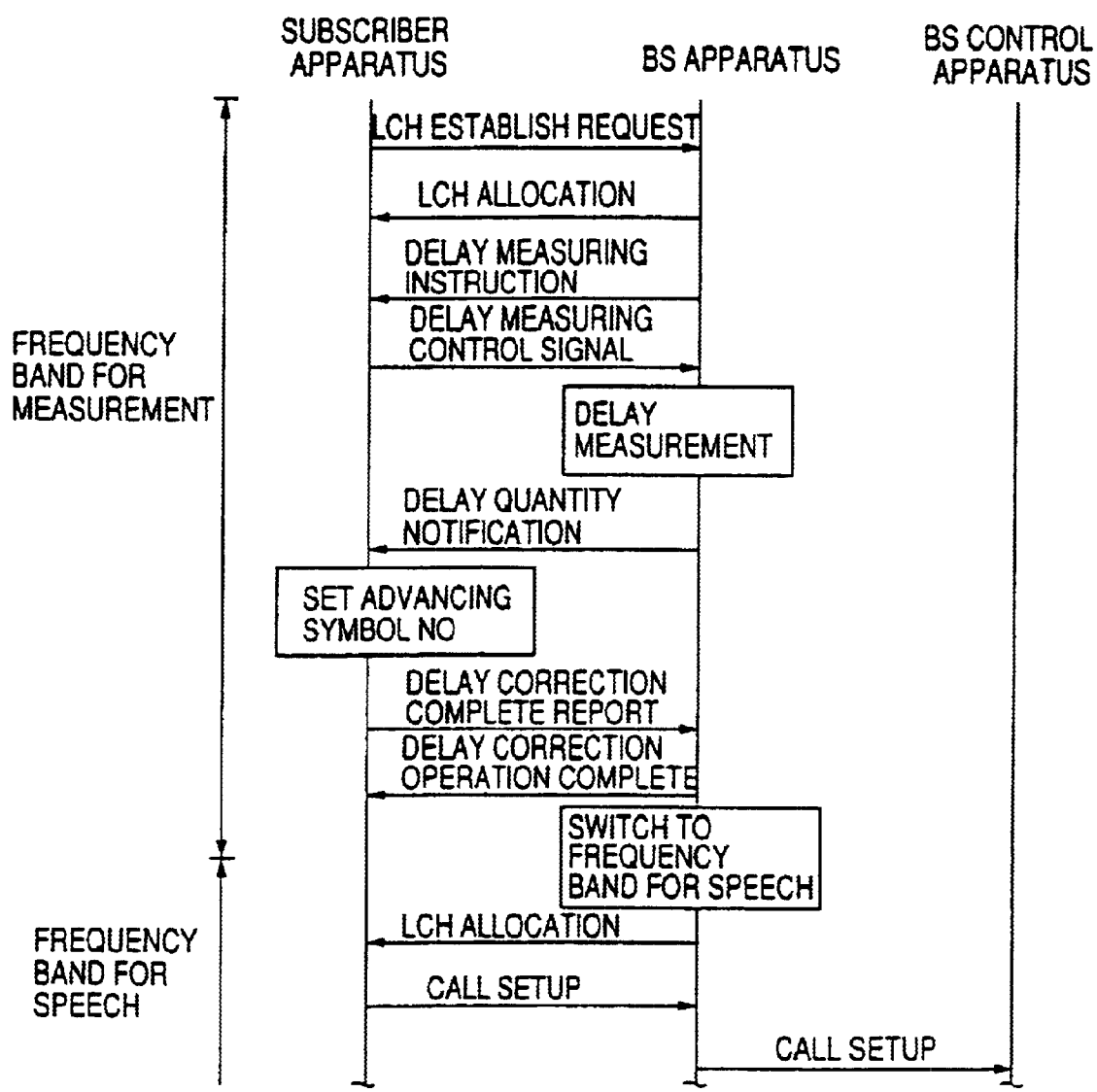
FIG. 17 is a timing chart for explaining the delay measuring operation and the delay correcting operation.

FIG. 12 is a diagram for explaining the delay measuring operation, and FIG. 17 is a timing chart for explaining the delay measuring operation and the delay correcting operation for this case.

When the subscriber control processor 222 shown in FIG. 16 requests the link channel (LCH) allocation depending on the analysis result of the control channel analyzer 425, the subscriber control processor 222 first judges whether or not the correction of the transmission delay for the subscriber apparatus 220 is completed. If the correction of the transmission delay for the subscriber apparatus 220 is not completed, the subscriber control processor 222 transmits a link channel (LCH) establish request which includes a control signal indicating that the delay correction is not completed to the base station apparatus 210, via the TDMA LSI 225 and the measuring transmission and reception processor 224, as shown in FIG. 17.

The link channel establish request is a signal in the measuring frequency band described above. Hence, the link channel establish request is received by the measuring transmission and reception processor 215 of the base station apparatus 210, and is input to the TDMA LSI 216 via the shift processor 211.

In this state, the base station control processor 212 operates as the establish request detecting means 163 and the measuring instruction transmitting means 161 of the eleventh aspect of the present invention described above, depending on the analysis result obtained from the control channel analyzer 217, and instructs the TDMA LSI 216 to transmit the predetermined control signal fc.

When the TDMA LSI 216 operates depending on the instruction from the base station control processor 212, the functions of the second signal transmitting means 141 of the sixth aspect of the present invention described above are realized. Hence, the predetermined control signal fc can be transmitted to the subscriber apparatus 220 via the measuring transmission and reception processor 215, as the measuring signal, as shown in FIG. 17.

On the other hand, this measuring signal is received by the measuring transmission and reception processor 224 of the subscriber apparatus 220, and is supplied to the TDMA LSI 225 to be processed therein.

In this state, the subscriber control processor 222 instructs the TDMA LSI 225 to transmit the predetermined control signal fc described above as a response with respect to the received measuring signal, depending on the analysis result obtained from the control channel analyzer 226.

Accordingly, the functions of the measuring signal respond means 142 of the sixth aspect of the present invention described above are realized when the TDMA LSI 225 operates depending on the instruction from the subscriber control processor 222, and it is possible to transmit the predetermined control signal fc to the base station apparatus 210 via the measuring transmission and reception processor 224, as the response with respect to the measuring signal, as shown in FIG. 17.

Due to the transmission delay between the base station apparatus 210 and the subscriber apparatus 220, the measuring signal is delayed by the time δ at the time when the measuring signal reaches the subscriber apparatus 220, as shown in FIG. 12. The response signal is transmitted from the subscriber apparatus 220 at the transmission timing, maintaining this delay.

Accordingly, the delay measuring unit 218 merely needs to measure the error between the timing at which the response signal reaches the base station apparatus 210 and the reception timing based on the frame period of the base station apparatus 210, that is, the timing corresponding to the start of the time slots allocated for the channels in which the measuring signals are transmitted and received.

For example, the delay measuring unit 218 receives a signal which indicates the reception timing based on the frame period from the TDMA LSI 216. After receiving this signal, the delay measuring unit 218 measures the time until the response signal is received by the measuring transmission and reception processor 215, and the measured time is supplied to the base station control processor 212 as the delay quantity.

The base station control processor 212 creates control information which includes the delay quantity received from the delay measuring unit 218, and transmits the control information to the subscriber apparatus 220 via the TDMA LSI 216 and the measuring transmission and reception processor 215.

Therefore, when the base station control processor 212 and the TDMA LSI 216 operate by receiving the delay quantity from the delay measuring unit 218, it is possible to realize the functions of the second delay notifying means 144 of the sixth aspect of the present invention described above. Hence, it is possible to notify the delay quantity measured in the base station apparatus 210 to the subscriber apparatus 220, as indicated by "delay quantity notification" in FIG. 17.

On the other hand, when the measuring transmission and reception processor 224 of the subscriber apparatus 220 receives the delay quantity notification, the subscriber control processor 222 receives via the control channel analyzer 226 the information which indicates the delay quantity included in this delay quantity notification. Based on the delay quantity, the subscriber control processor 222 sets the appropriate advancing symbol number in the timing adjuster 223.

Therefore, the functions of the first timing adjusting means 121 of the sixth aspect of the present invention are realized when the control channel analyzer 226 and the subscriber control processor 222 operate depending on the reception of the delay quantity notification. By setting the advancing symbol number depending on the delay quantity included in the delay quantity notification, it is possible to cancel the transmission delay between the base station apparatus 210 and the subscriber apparatus 220.

In addition, when the setting of the advancing symbol number is completed, the subscriber control processor 222 transmits a "delay correction complete report" via the TDMA LSI 225 as shown in FIG. 17, and waits for the response from the base station apparatus 210. The subscriber control processor 222 ends the delay correcting operation when the response from the base station apparatus 210 is received, and the normal communication is carried out thereafter.

On the other hand, when the analysis result from the control channel analyzer 217 indicates that the delay correction complete report is received, the base station control processor 212 transmits a "delay correction complete" via the TDMA LSI 216, as shown in FIG. 17, as the response to the subscriber apparatus 220, and the delay correcting operation ends.

Then, the base station control processor 212 transmits a link channel allocation signal via the TDMA LSI 412 as shown in FIG. 17, and allocates appropriate speech channels to the subscriber apparatus 220 in the frequency band for speech. Thereafter, an appropriate process is carried out depending on a call setup request or the like received from the subscriber apparatus 220 via the speech channels.

By correcting the transmission delay between the base station apparatus 210 and the subscriber apparatus 220 as described above, it is possible to enlarge the area coverage provided by one base station apparatus 210. In addition, it becomes possible to use the subscriber apparatuses 220 having the same construction, regardless of the distance from the base station apparatus 210. As a result, it is possible to realize a wireless telephone system which is suited for the sparsely populated region.

When employing the system in which the delay measuring operation and the delay correcting operation are distributed between the base station apparatus 210 and the subscriber apparatus 220, it becomes possible to distribute the load on the hardware and software which are required for the correction of the transmission delay.

Accordingly, the system described above is suited for use in a wireless telephone system for mobile subscriber apparatuses. This is because, in mobile communication systems, it is important to reduce the size and weight of the subscriber apparatus, and there are demands to minimize the load on the hardware and software of the subscriber apparatus.

Furthermore, when the measuring signal for measuring the delay is transmitted and received using the measuring frequency band which is different from the normal frequency band for speech, it is possible to carry out the delay measuring operation while maintaining the number of speech channels.

Next, a description will be given of the method of correcting the transmission delay in the base station apparatus.

Figure 18:
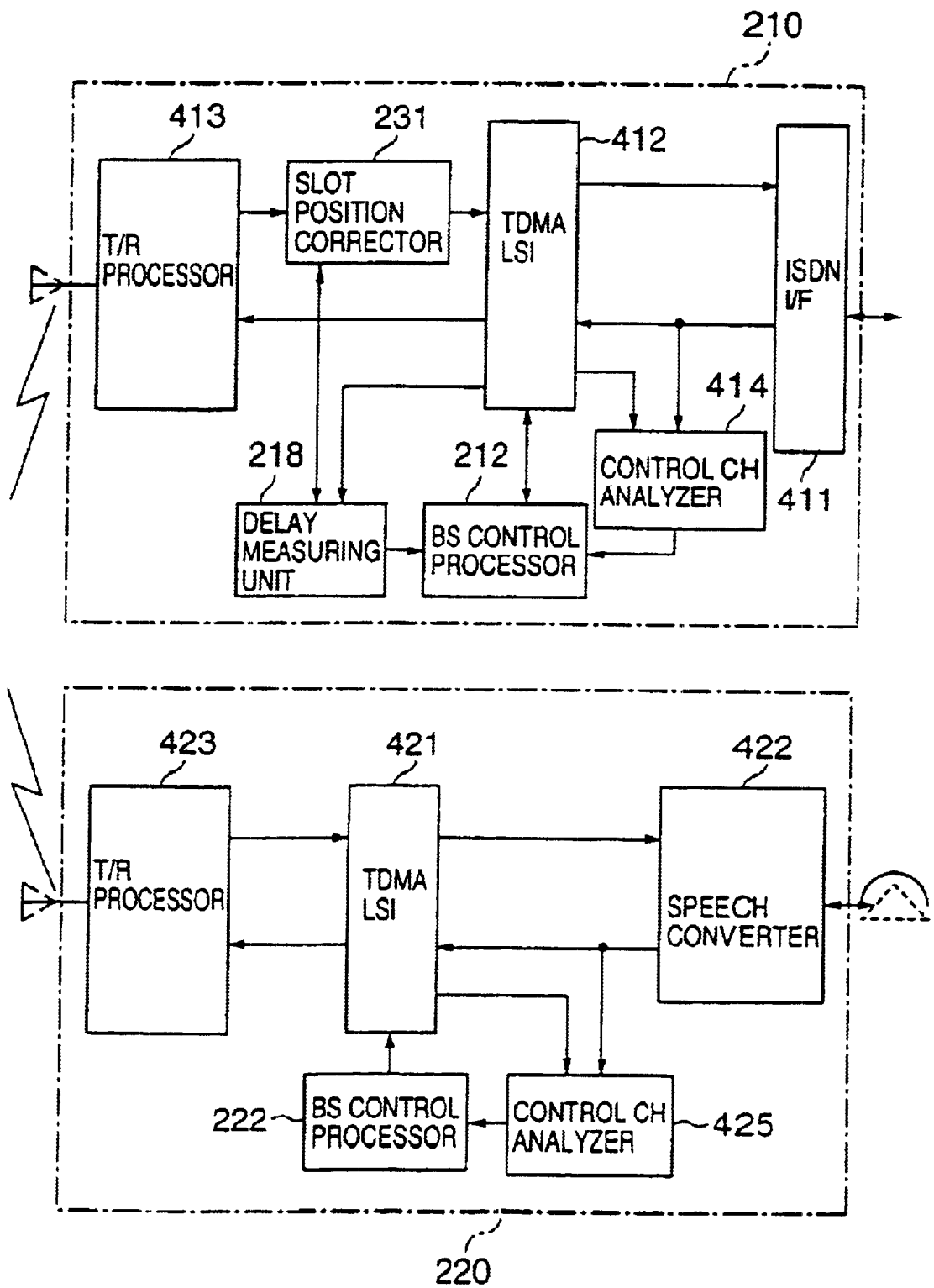
FIG. 18 is a system block diagram showing a wireless telephone system applied with a third embodiment of the delay correction system according to the present invention.
Figure 19:
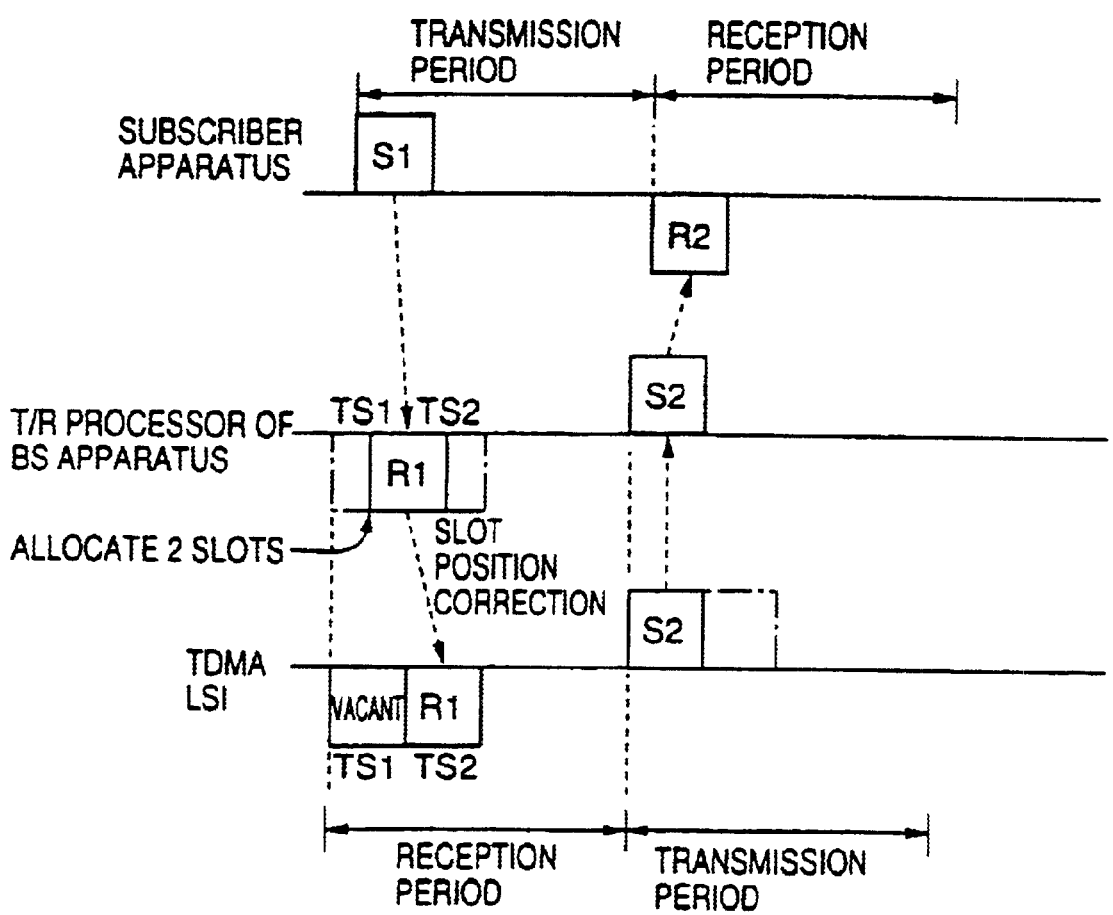
FIG. 19 is a diagram for explaining the delay correcting operation.
Figure 20:
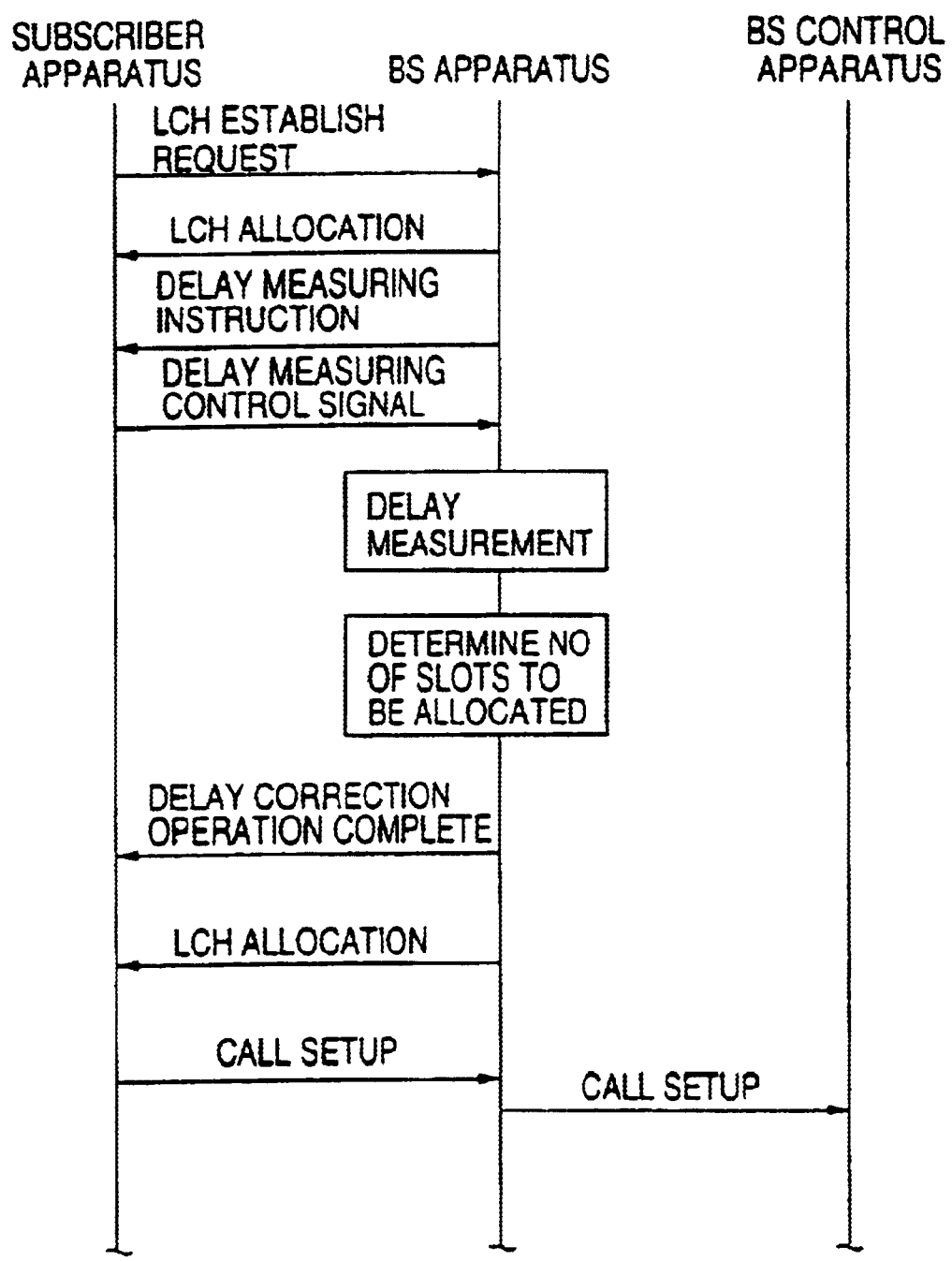
FIG. 20 is a timing chart for explaining the delay measuring operation and the delay correcting operation.

FIG. 18 is a system block diagram showing a wireless telephone system applied with a third embodiment of the delay correction system according to the present invention. FIG. 19 is a diagram for explaining the delay correcting operation, and FIG. 20 is a timing chart for explaining the delay measuring operation and the delay correcting operation. This third embodiment of the delay correction system employs the second aspect of the present invention described above.

The base station apparatus 210 shown in FIG. 18 additionally includes a slot position corrector 231 in the base station apparatus 410 shown in FIG. 1, and received information which is received by the transmission and reception processor 413 is supplied via the slot position corrector 231 to the TDMA LSI 412 to be processed therein. In addition, in place of the base station control processor 415 shown in FIG. 1, the base station apparatus 210 shown in FIG. 18 is provided with the base station control processor 212.

In the base station apparatus 210 shown in FIG. 18, the delay measuring unit 218 corresponds to the second delay detecting means 143 of the seventh aspect of the present invention described above. The delay measuring unit 218 measures the delay quantity depending on an instruction from the base station control processor 212, and supplies the measured result to the base station control processor 212 to be processed therein.

Moreover, the slot position corrector 231 shown in FIG. 18 carries out a process similar to that of the shift processor 211 described above, with respect to 2 successive time slots secured for the control channels. In addition, the slot position corrector 231 carries out a slot position correcting operation which will be described later, with respect to the time slots allocated for the speech channels, depending on an instruction from the base station control processor 212.

On the other hand, the subscriber apparatus 220 shown in FIG. 18 includes the subscriber control processor 222, in place of the subscriber control processor 424 shown in FIG. 1.

In this case, when the base station control processor 212 judges that the link channel establish request from the subscriber apparatus 220 is received, for example, based on the analysis result from the control channel analyzer 424, the base station control processor 212 instructs the start of the delay measuring operation to the delay measuring unit 218. The base station control processor 212 also transmits the predetermined control signal fc via the TDMA LSI 412, as the measuring signal, as shown in FIG. 20.

The functions of the second measuring signal transmitting means 141 of the seventh aspect of the present invention described above are realized when the TDMA LSI 412 operates depending on the instruction from the base station control processor 212. Hence, it is possible to transmit the measuring signal to the subscriber apparatus 220 depending on the input of the delay measuring instruction.

The functions of the measuring signal respond means 142 of the seventh aspect of the present invention described above are realized by the transmission and reception processor 423, the control channel analyzer 425 and the subscriber control processor 222 of the subscriber apparatus 220 which operate depending on the input of the measuring signal. Hence, the predetermined control signal described above is transmitted to the base station apparatus 210, as shown in FIG. 20.

As described above in conjunction with FIG. 12, the error between the actual reception timing of the response signal and the reception timing based on the frame period of the base station apparatus 210 indicates the transmission delay of both the up-path and the down-path between the base station apparatus 210 and the subscriber apparatus 220.

In this case, the delay measuring unit 218 measures the error caused by the transmission delay, based on the reception timing of the response signal with respect to the measuring signal transmitted by use of the frequency band for speech, and the measured result is transmitted to the base station control processor 212.

First, the base station control processor 212 compares the received delay quantity and a predetermined threshold value TH, and determines a number of time slots to be allocated as the speech channels. The base station control processor 212 transmits this time slot allocation to the slot position corrector 231 together with the delay quantity, if necessary.

Figures 2, 3:
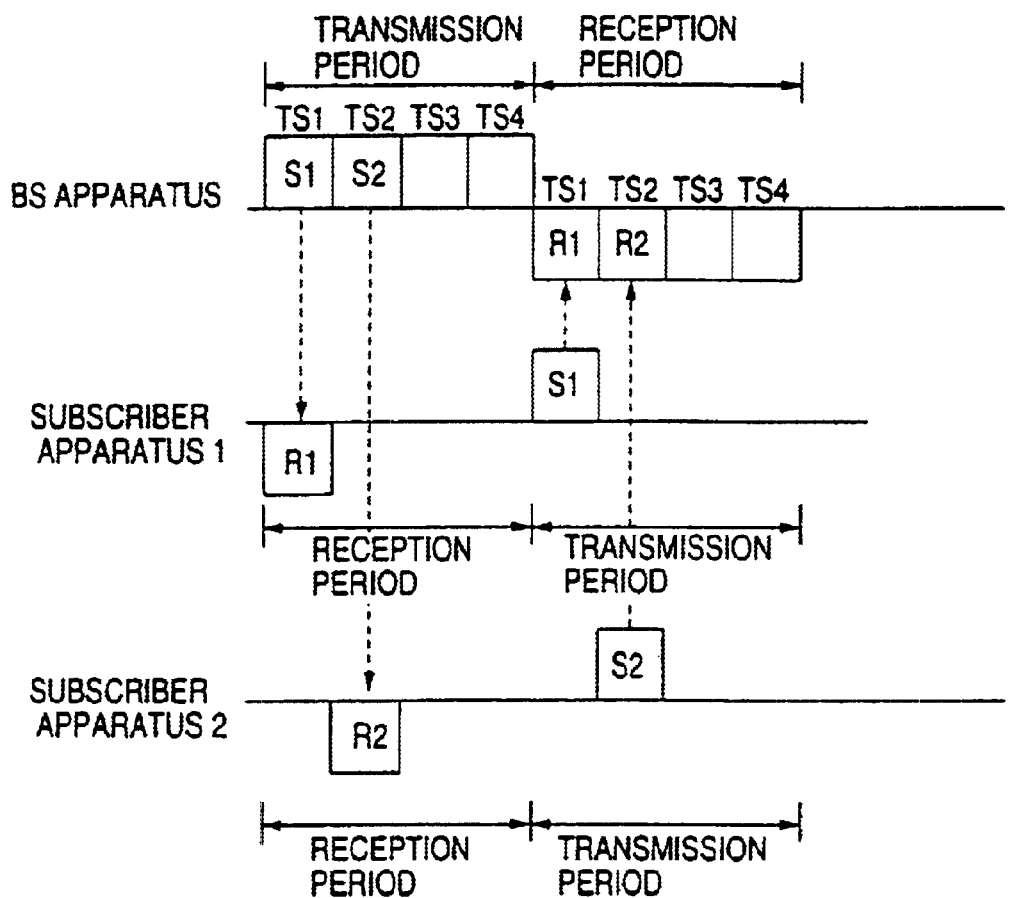
FIG. 2 is a diagram for explaining time slots allocated in a transmission period and a reception period.
FIG. 3 is a diagram showing a structure of information exchanged between a base station apparatus and a subscriber apparatus.
Figure 4:
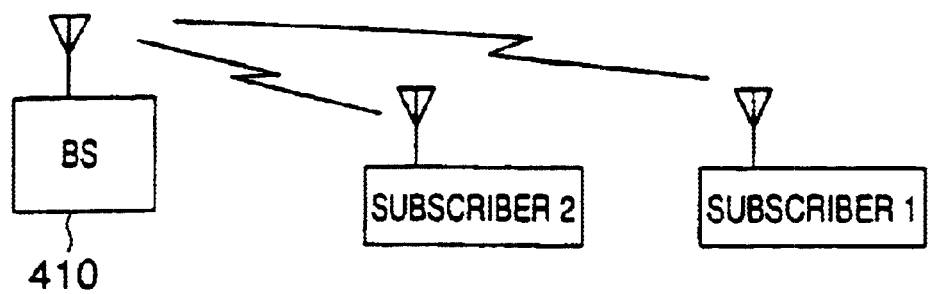
FIG. 4 is a diagram for explaining interference caused by a transmission delay.

In this state, the base station control processor 212 uses the threshold value TH corresponding to the delay quantity which can be absorbed by the ramp bits and the guard bits shown in FIG. 3, for example, and judges that the delay correction is unnecessary if the delay quantity is less than or equal to this threshold value TH. In this case, the base station control processor 212 allocates 1 time slot in the base station apparatus 210 with respect to the speech channels allocated to the subscriber apparatus 220. On the other hand, if the delay quantity is greater than the threshold value TH, the base station control processor 212 allocates 2 successive time slots in the base station apparatus 210 with respect to the speech channels allocated to the subscriber apparatus 220.

When the received allocation result indicates that 1 time slot is allocated, the slot position corrector 231 shown in FIG. 18 supplies the received information of the corresponding time slot from the transmission and reception processor 413, as it is, to be processed in the TDMA LSI 412.

On the other hand, when the received allocation result indicates that 2 time slots are allocated, the slot position corrector 231 corrects the transmission delay in the following manner.

That is, as shown in FIG. 19, the slot position corrector 231 in this case receives the received information R1 which is received by the transmission and reception processor 413 spanning the 2 time slots TS1 and TS2 allocated for the speech channels. Based on the delay quantity received from the base station control processor 212, the slot position corrector 231 moves the time position of the received information R1 to the latter time slot TS2, and makes the first or preceding time slot TS1 vacant.

Therefore, the functions of the time slot correcting means 111 of the second aspect of the present invention are realized when the slot position corrector 231 operates depending on the instruction from the base station control processor 212, and the received information R1 corresponding to the transmitting information S1 which is transmitted in the transmission period of the subscriber apparatus 220 is supplied to the TDMA LSI 412 in the time slot of the reception period of the base station apparatus 210 to be processed in the TDMA LSI 412.

On the other hand, as shown in FIG. 19, the transmitting information S2 from the base station apparatus 210 may be transmitted as it is via the TDMA LSI 412 and the transmission and reception processor 413. In this case, the transmitting information S2 reaches the subscriber apparatus 220 in the appropriate time slot of the reception period of the subscriber apparatus 220.

Accordingly, it is possible to correct the transmission delay between the base station apparatus 210 and the subscriber apparatus 220 by forcibly moving the time slot of the received information from the subscriber apparatus 220.

Thereafter, the base station control processor 212 transmits a control signal which indicates completion of the delay correction to the subscriber apparatus 220 via the TDMA LSI 412, and the delay correcting operation ends by allocating the link channels, as shown in FIG. 20. Next, the normal speech process is started, so as to make the call setup process from the subscriber apparatus 220 or the like, as shown in FIG. 20.

Therefore, it is possible to enlarge the area coverage provided by one base station apparatus 210. In addition, it becomes possible to use the subscriber apparatuses 220 having the same construction, regardless of the distance from the base station apparatus 210. As a result, it is possible to realize a wireless telephone system which is suited for the sparsely populated region.

When employing the system in which both the delay measuring operation and the delay correcting operation are carried out centrally by the base station apparatus 210, it becomes possible to reduce the load on the subscriber apparatus 220. Accordingly, the system described above is particularly suited for use in a wireless telephone system for mobile subscriber apparatuses.

In addition, the number of time slots allocated in the base station apparatus 210 may be notified to the subscriber apparatus 220, together with the control signal which is shown in FIG. 20 and indicates the completion of the delay correction. In this case, the subscriber control processor 222 holds the number of time slots, and when thereafter requesting link channel allocation, the number of time slots is notified to the base station apparatus 210. Hence, the subsequent delay measuring operation may be omitted in this case.

On the other hand, even in the case where the delay correcting operation is carried out by the base station apparatus 210, it is possible to distribute the delay measuring operation to the subscriber apparatus 220.

Figure 21:
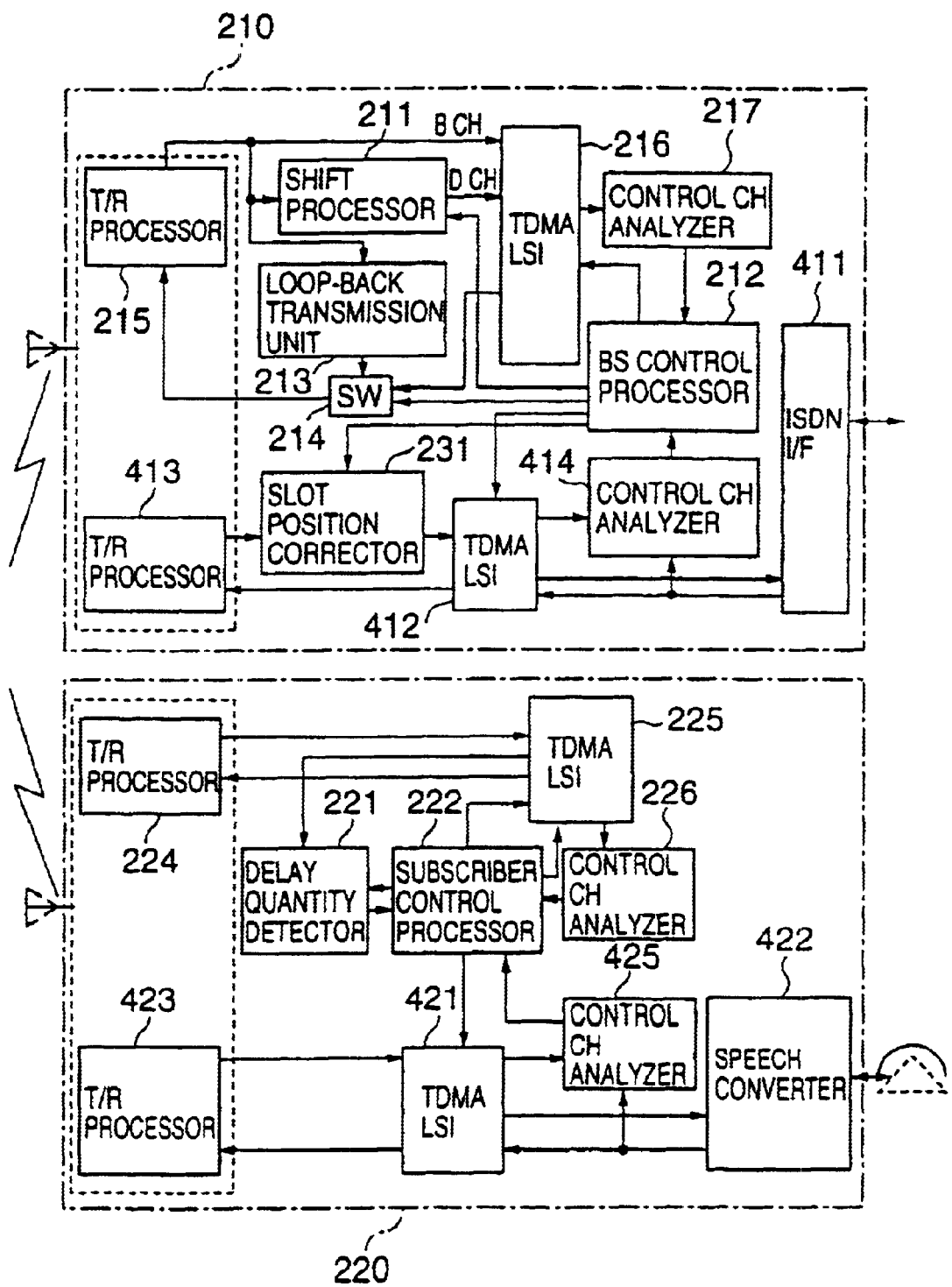
FIG. 21 is a system block diagram showing a wireless telephone system applied with a modification of the third embodiment of the delay correction system according to the present invention.
Figure 22:
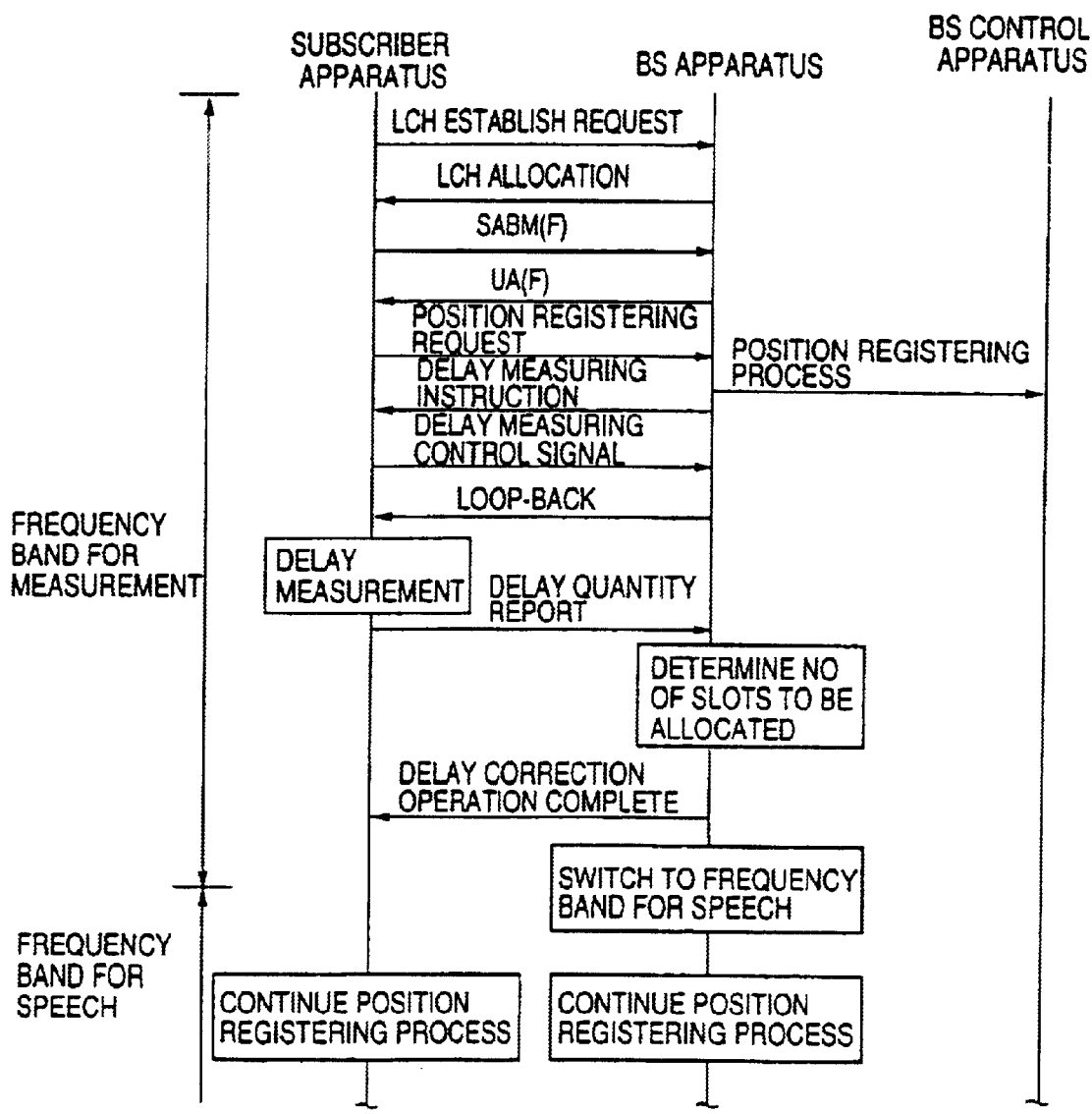
FIG. 22 is a timing chart for explaining the delay measuring operation and the delay correcting operation.

FIG. 21 is a system block diagram showing a wireless telephone system applied with a modification of the third embodiment of the delay correction system according to the present invention. Further, FIG. 22 is a timing chart for explaining the delay measuring operation and the delay correcting operation. This modification of the third embodiment of the delay correction system employs the second and fifth aspects of the present invention described above.

In FIG. 21, the base station apparatus 210 includes the slot position corrector 231 in addition to the elements of the base station apparatus 210 shown in FIG. 16. In addition, the received information received by the transmission and reception processor 413 is supplied via the slot position corrector 231 to the TDMA LSI 412 to be processed therein.

Moreover, the subscriber apparatus 220 shown in FIG. 13 includes the delay quantity detector 221 in place of the timing adjuster 223 shown in FIG. 16. The delay quantity detector 221 detects the delay quantity based on the received signal which is received via the TDMA LSI 225, depending on the instruction from the subscriber control processor 222. The detected delay quantity is supplied to the subscriber control processor 222 to be processed therein.

In this case, the signals of each of the procedures preceding the position registering process are transmitted and received as shown in FIG. 22, using the measuring frequency band which is different from the frequency band for speech. Further, the delay measuring instruction and the transmission and reception of the measuring signal are carried out as shown in FIG. 22 depending on the position register request signal from the subscriber apparatus 220, as described above in conjunction with FIGS. 10 and 11.

In this state, the delay quantity detector 221 of the subscriber apparatus 220 compares the reception timing of the measuring signal which is looped back by the base station apparatus 210 and the reception timing which is based on the reception period of the subscriber apparatus 220, and detects the delay quantity caused by the transmission delay between the subscriber apparatus 220 and the base station apparatus 210.

The subscriber control processor 222 creates the predetermined control signal which includes the delay quantity detected by the delay quantity detector 221, and transmits the predetermined control signal, as a delay quantity report signal, to the base station apparatus 210 via the TDMA LSI 421, as shown in FIG. 22.

On the other hand, the base station control processor 212 receives the delay quantity described above from the control channel analyzer 217, as the analysis result with respect to the delay quantity report. Based on the received delay quantity, the base station control processor 212 determines the number of time slots to be allocated for the corresponding subscriber apparatus 220, and supplies the number of time slots to the slot position corrector 231 to be processed therein.

In addition, the base station control processor 212 transmits the predetermined control signal, as the delay correcting operation complete, to the subscriber apparatus 220 via the TDMA LSI 216. Then, the base station control processor 212 switches to the frequency band for speech, and thereafter controls the operation of the TDMA LSI 412 depending on the analysis result of the control channel analyzer 414, to continue the position registering process.

Similarly, the subscriber control processor 222 switches to the frequency band for speech depending on the control signal which indicates the delay correcting operation complete and is received from the base station apparatus 210. Thereafter, the subscriber control processor 222 controls the operation of the TDMA LSI 421 depending on the analysis result of the control channel analyzer 425, to continue the position registering process.

Therefore, the delay quantity detected in the subscriber apparatus 220 is notified to the base station apparatus 210, and the transmission delay between the base station apparatus 210 and the subscriber apparatus 220 is corrected by the slot position corrector 231 which is provided in the base station apparatus 210.

In this case, the delay measuring process is carried out by the subscriber apparatus 220, and for this reason, it is possible to reduce the processing load on the base station apparatus 210.

Next, a description will be given of the method of correcting the delay solely by the subscriber apparatus 220.

Figure 23:
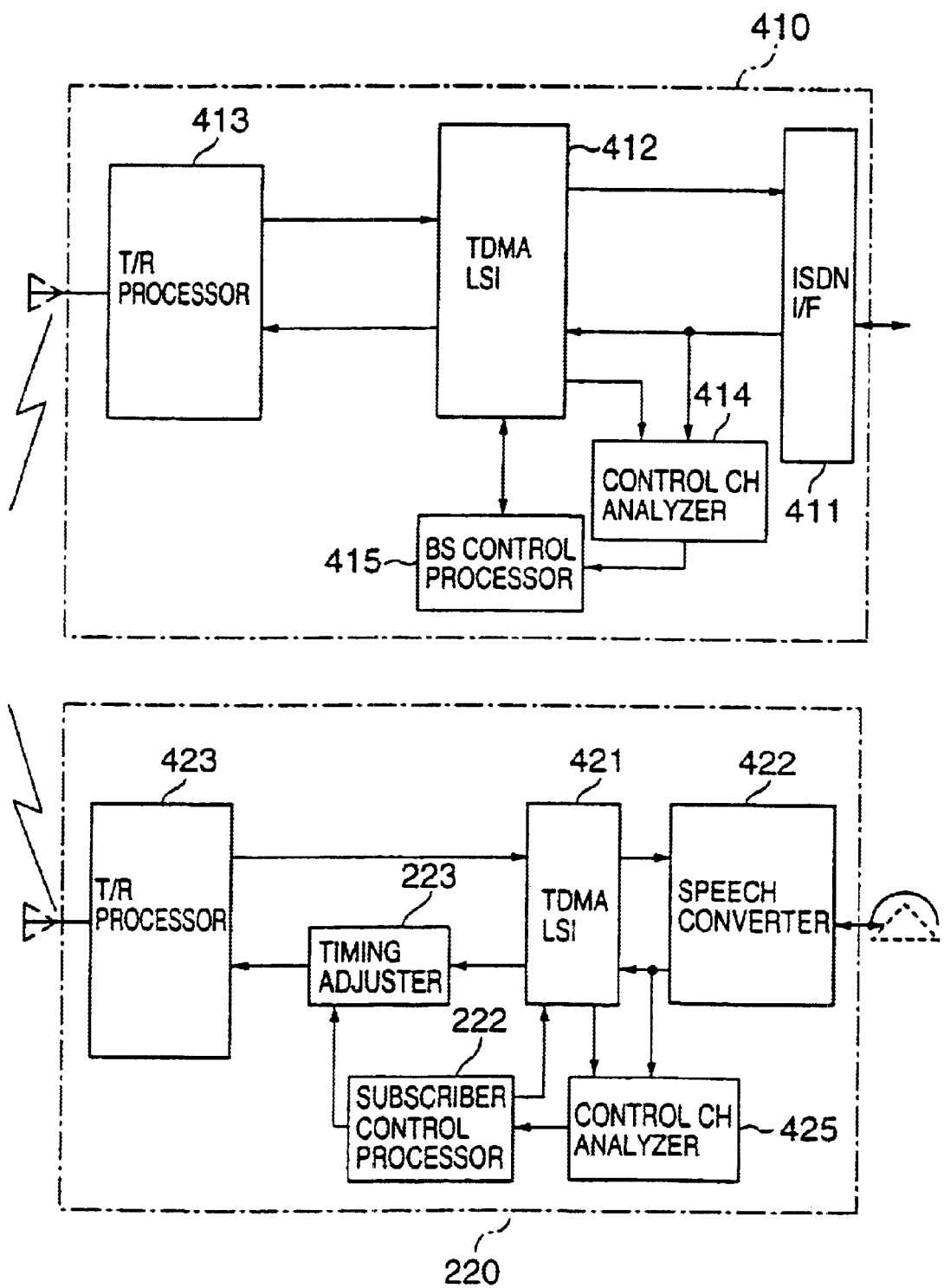
FIG. 23 is a system block diagram showing a wireless telephone system applied with a fourth embodiment of the delay correction system according to the present invention.
Figure 24:
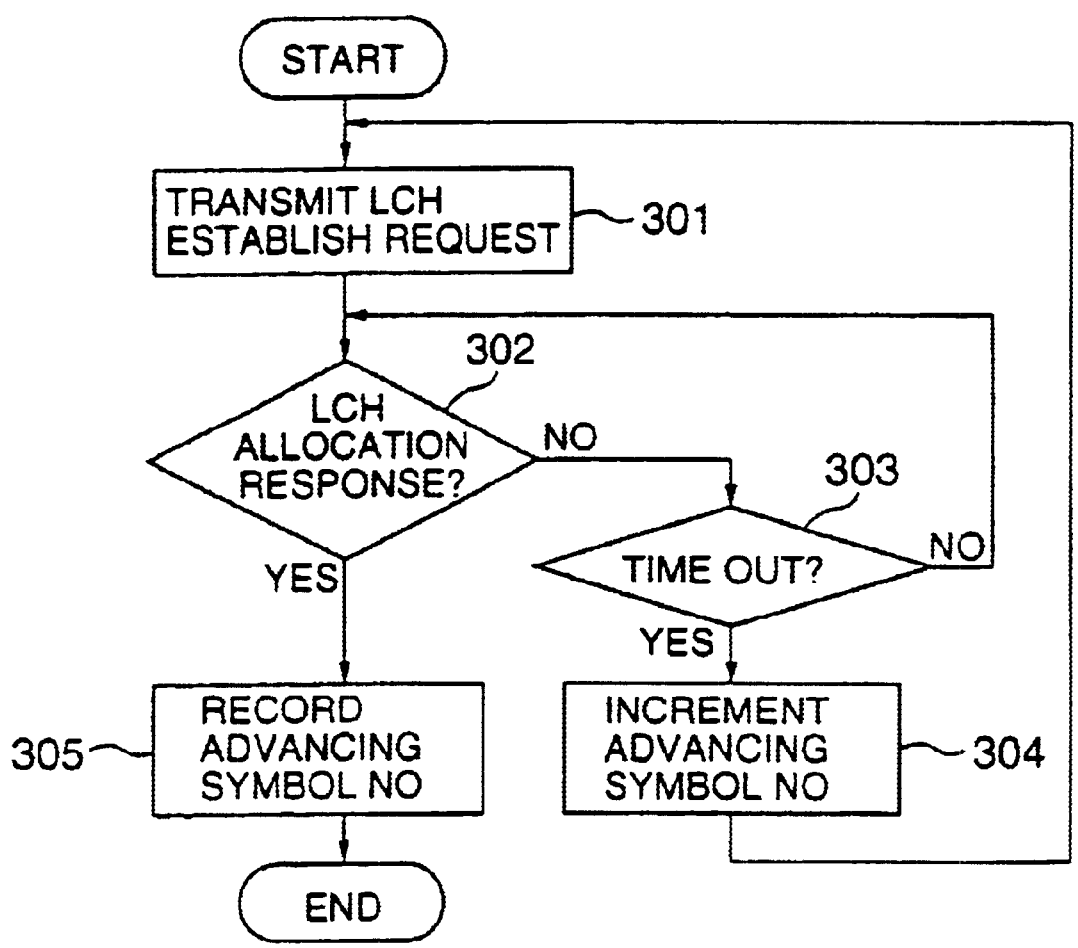
FIG. 24 is a flow chart for explaining the delay correcting operation.

FIG. 23 is a system block diagram showing a wireless telephone system applied with a fourth embodiment of the delay correction system according to the present invention. FIG. 24 is a flow chart for explaining the delay correcting operation, and FIG. 25 is a timing chart for explaining the delay correcting operation.

In the subscriber apparatus 220 shown in FIG. 23, the subscriber control processor 222 controls the operation of the TDMA LSI 421 and the timing adjuster 223, based on the analysis result of the control channel analyzer 425.

The subscriber control processor 222 transmits the link channel establish request via the TDMA LSI 421 depending on the analysis result of the control channel analyzer 425, in a step 301. Thereafter, steps 302 and 303 are repeated. More particularly, the step 302 decides whether or not a link channel (LCH) allocation response is received, and the step 303 decides whether or not a predetermined time has elapsed (time out). Hence, the link channel allocation response from the base station apparatus 210 is waited, and a time out is detected when the predetermined time elapses. If the time out is detected and the decision result in the step 303 becomes YES, it is judged that the delay correction is necessary.

Figure 25:
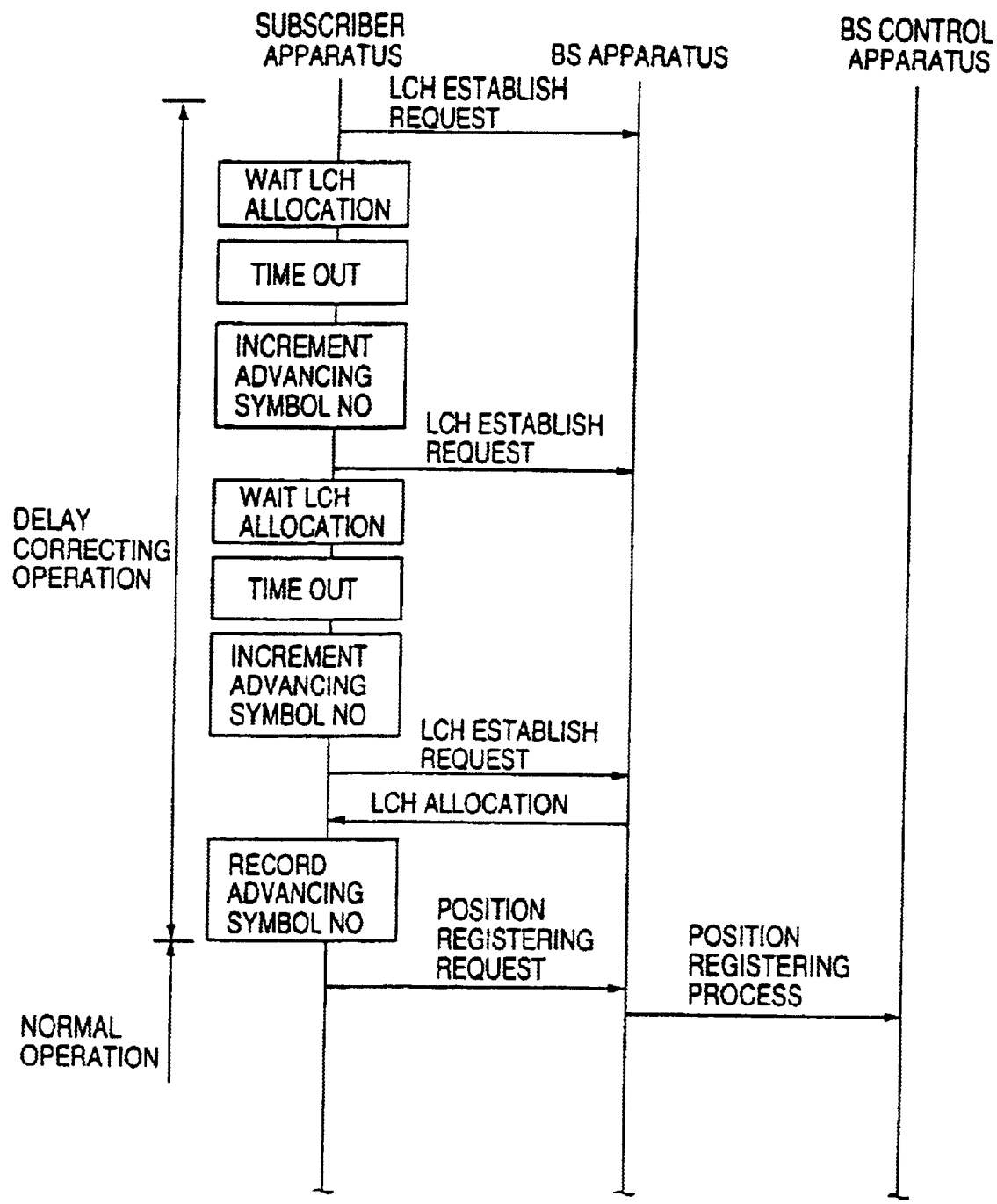
FIG. 25 is a timing chart for explaining the delay correcting operation.

In a case where the transmission delay which exists cannot be absorbed by the ramp bits and the guard bits shown in FIG. 3, the link channel establish request from the subscriber apparatus 220 and shown in FIG. 25 is not correctly received by the base station apparatus 210. Hence, a response indicating that the link channel allocation will be made cannot be obtained from the base station apparatus 210 in this case.

In such a case, the decision result in the step 302 is NO, the subscriber control processor 222 judges that the delay correction is necessary, and the decision result in the step 303 becomes YES. Hence, the subscriber control processor 222 increments the advancing symbol number which is to be set in the timing adjuster 223 by a predetermined number in a step 304, and the process returns to the step 301 to transmit the link channel establish request.

Accordingly, the subscriber control processor 222 increases the advancing symbol number depending on the decision result of the step 303, and the functions of the transmission timing search means 125 of the third aspect of the present invention described above are realized. For this reason, it is possible to change the adjusting quantity of the timing adjuster 223 corresponding to the second timing adjusting means 123.

When the adjusting quantity of the timing adjuster 223 is changed and the transmission delay between the base station apparatus 210 and the subscriber apparatus 220 is cancelled by the operation of the timing adjuster 223, the link channel allocation response is returned from the base station apparatus 210 within a predetermined time. FIG. 25 shows a case where the third link channel establish request is accepted.

Depending on the reception of the link channel allocation response, the subscriber control processor 222 judges that the link channel allocation response is received, and the decision result in the step 302 becomes YES. In this case, the subscriber control processor 222 holds, in a step 305, the present advancing symbol number n which is set in the timing adjuster 223, and the delay correcting operation ends. Thereafter, the position registering process or the like is carried out according to the normal processing procedure.

In addition, as described above, the subscriber control processor 222 repeats the step 301 if the decision result in the step 303 is YES, and the process ends after carrying out the step 305 if the decision result in the step 302 is YES. As a result, it is possible to realize the functions of the establishment request means 124 and the channel allocation monitoring means 126 of the third aspect of the present invention described above.

Therefore, if the subscriber control processor 222 is constructed to search the appropriate advancing symbol number while controlling the operation of the timing adjuster 223 when making the link channel establish request, it is possible to correct the transmission delay solely by the subscriber apparatus 220. Hence, as shown in FIG. 23, it is possible in this case to use the existing base station apparatus 410 as it is.

In addition, when making a call operation or the like thereafter, the subscriber control processor 222 uses the advancing symbol number n which is held as the search result in the step 304 as an initial value, and the adjusting operation of the timing adjuster 223 is controlled based thereon.

Therefore, it is possible to reduce the time required to establish the link channels.

Further, the present invention is not limited to these embodiments, but various variations and modifications may be made without departing from the scope of the present invention.

What is claimed is:

1. A delay correction system for a wireless telephone system in which a base station apparatus and at least one subscriber apparatus carry out transmitting and receiving operations via respective communication means, in conformance with a time division multiple access (TDMA) system using the base station apparatus as a synchronization reference, said delay correction system comprising:
    measuring instruction input means for inputting a delay measuring instruction which instructs a delay measurement based on a new registration or a moving of the subscriber apparatus;
    delay measuring means, responsive to the delay measuring instruction, for measuring a delay quantity between the base station apparatus and the subscriber apparatus based on a signal received over a control channel; and
    first timing adjusting means, provided in the subscriber apparatus, for receiving transmitting information which is to be sent to the base station apparatus at an allocated time slot, and for adjusting a timing of the transmitting information depending on the delay quantity before sending the transmitting information.

2. The delay correction system as claimed in claim 1, wherein said measuring instruction input means comprises:
    measuring instruction transmitting means for transmitting a delay measuring instruction depending on an input of a measuring start instruction; and
    correcting instruction accepting means for accepting and input of a delay correcting instruction and transmitting the measuring start instruction to said measuring instruction transmitting means depending on the acceptance of the delay correcting instruction.

3. The delay correction system as claimed in claim 1, wherein said delay measuring means measures the delay quantity between the base station apparatus and the subscriber apparatus using a unique word included in the signals received over the control channel.

4. The delay correction system as claimed in claim 1, wherein said measuring instruction input means inputs the delay measuring instruction in response to a position register request from the subscriber apparatus or an instruction issued from a maintenance management system which is coupled to the base station apparatus.

5. A delay correction system for a wireless telephone system in which a base station apparatus and at least one subscriber apparatus carry out transmitting and receiving operations via respective communication means, in conformance with a time division multiple access (TDMA) system using the base station apparatus as a synchronization reference, said delay correction system comprising:
    measuring instruction input means for inputting a delay measuring instruction which instructs a delay measurement;
    delay measuring means for measuring a delay quantity between the base station apparatus and the subscriber apparatus; and
    first timing adjusting means, provided in the subscriber apparatus, for receiving transmitting information which is to be sent to the base station apparatus at an allocated time slot, and for adjusting a timing of the transmitting information depending on the delay quantity before sending the transmitting information;
    wherein said delay measuring means comprises:
        first signal transmitting means, provided in the subscriber apparatus, for transmitting a measuring signal which is used as a reference when measuring the delay quantity, depending on the delay measuring instruction from said measuring instruction input means;

subscriber and measuring signal communicating means, provided in the subscriber apparatus, for exchanging the measuring signal with the base station apparatus;

base station and measuring signal communicating means, provided in the base station apparatus, for exchanging the measuring signal with the subscriber apparatus;

loop-back means, provided in the base station apparatus, for looping back the measured signal which is received via said base station end measuring signal communicating means after a predetermined time, as a response signal to the subscriber apparatus; and first delay detecting means, provided in the subscriber apparatus, for detecting the delay quantity of the transmission delay between the subscriber apparatus and the base station apparatus, based on an error between a timing at which the response signal should be received and a timing at which the response signal is actually received from said subscriber end measuring signal communicating means, said first timing adjusting means adjusting the transmission timing based on the delay quantity which is received from said first delay detecting means.

6. The delay correction system as claimed in claim 5, wherein:

said base station end measuring signal communicating means comprises:

first signal inserting means for securing, as measuring signal transmitting channels, two successive time slots of a transmission period provided by said communication means of the base station apparatus, and transmitting the measuring signal in the measuring signal transmitting channels; and first signal separating means for securing, as measuring signal receiving channels, two successive time slots of a reception period provided by said communications means, and separating the signal received in the measuring signal receiving channels, and said subscriber end measuring signal communicating means comprises:

second signal inserting means for securing, as measuring signal transmitting channels, two successive time slots of a transmission period provided by said communication means of the subscriber apparatus, and transmitting the measuring signal in the measuring signal transmitting channels; and second signal separating means for securing, as measuring signal receiving channels, two successive time slots of a reception period provided by said communication means, and separating the measuring signal received in the measuring signal receiving channels.

7. The delay correction system as claimed in claim 5, wherein said base station and measuring signal communicating means and said subscriber end measuring signal communicating means communicate the measuring signals using frequency bands which are different from those used by the respective communication means of the other of said base station and measuring signal communicating means and said subscriber end measuring signal communicating means.

8. A delay correction system for a wireless telephone system in which a base station apparatus and at least one subscriber apparatus carry out transmitting and receiving operations via respective communication means, in conformance with a time division multiple access (TDMA) system using the base station apparatus as a synchronization reference, said delay correction system comprising:

measuring instruction input means for inputting a delay measuring instruction which instructs a delay measurement;

delay measuring means for measuring a delay quantity between the base station apparatus and the subscriber apparatus; and first timing adjusting means, provided in the subscriber apparatus, for receiving transmitting information which is to be sent to the base station apparatus at an allocated time slot, and for adjusting a timing of the transmitting information depending on the delay quantity before sending the transmitting information;

wherein said delay measuring means comprises:

second signal transmitting means, provided in the base station apparatus, for transmitting a measuring signal which is used as a reference when measuring the delay quantity, depending on the delay measuring instruction from said measuring instruction input means;

base station end measuring signal communicating means, provided in the base station apparatus, for exchanging a measuring signal with the subscriber apparatus;

measuring signal respond means, provided in the subscriber apparatus, for transmitting the measuring signal to the base station apparatus via said subscriber end measuring signal communicating means in a time slot allocated for the subscriber apparatus;

second delay detecting means, provided in the base station apparatus, for detecting the delay quantity of the transmission delay between the subscriber apparatus and the base station apparatus, based on an error between a timing at which a response signal with respect to the measuring signal should be received and a timing at which the response signal is actually transmitted by said measuring signal respond means; and second delay notifying means, provided in the base station apparatus, for transmitting delay information which indicates the delay quantity detected by said second delay detecting means to the subscriber apparatus via said base station and measuring signal communicating means, said first timing adjusting means adjusting the transmission timing base on the delay quantity which is indicated by the delay information received from said subscriber end measuring signal communicating means.

9. The delay correction system as claimed in claim 8, wherein:

said base station end measuring signal communicating means comprises:

first signal inserting means for securing, as measuring signal transmitting channels, two successive time slots of a transmission period provided by said communication means of the base station apparatus, and transmitting the measuring signal in the measuring signal transmitting channels; and first signal separating means for securing, as measuring signal receiving channels, two successive time slots of a reception period provided by said communication means, and separating the signal received in the measuring signal receiving channels, and said subscriber end measuring signal communicating means comprises:

second signal inserting means for securing, as measuring signal transmitting channels, two successive time slots of a transmission period provided by said communication means of the subscriber apparatus, and transmitting the measuring signal in the measuring signal transmitting channels; and second signal separating means for securing, as measuring signal receiving channels, two successive time slots of a reception period provided by said communication means, and separating the measuring signal received in the measuring signal receiving channels.

10. The delay correction system as claimed in claim 8, wherein said base station end measuring signal communicating means and said subscriber end measuring signal communicating means communicate the measuring signals using frequency bands which are different from those used by the respective communication means of the other of said base station end measuring signal communicating means and said subscriber end measuring signal communicating means.

11. A delay correction system for a wireless telephone system in which a base station apparatus and at least one subscriber apparatus carry out transmitting and receiving operations via respective communication means, in conformance with a time division multiple access (TDMA) system using the base station apparatus as a synchronization reference, said delay correction system comprising:

measuring instruction input means for inputting a delay measuring instruction which instructs a delay measurement;

delay measuring means for measuring a delay quantity between the base station apparatus and the subscriber apparatus; and first timing adjusting means, provided in the subscriber apparatus, for receiving transmitting information which is to be sent to the base station apparatus at an allocated time slot, and for adjusting a timing of the transmitting information depending on the delay quantity before sending the transmitting information;

wherein said measuring instruction input means comprises:

measuring instruction transmitting means for transmitting a delay measuring instruction depending on an input of a measuring start instruction; and register request detecting means for detecting a position register request from the subscriber apparatus and transmitting the measuring start instruction to said measuring instruction transmitting means in response to the position register request.

12. A delay correction system for a wireless telephone system in which a base station apparatus and at least one subscriber apparatus carry out transmitting and receiving operations via respective communication means, in conformance with a time division multiple access (TDMA) system using the base station apparatus as a synchronization reference, said delay correction system comprising:

measuring instruction input means for inputting a delay measuring instruction which instructs a delay measurement;

delay measuring means for measuring a delay quantity between the base station apparatus and the subscriber apparatus; and first timing adjusting means, provided in the subscriber apparatus, for receiving transmitting information which is to be sent to the base station apparatus at an allocated time slot, and for adjusting a timing of the transmitting information depending on the delay quantity before sending the transmitting information;

wherein said measuring input means comprises:

measuring instruction transmitting means for transmitting a delay measuring instruction depending on an input of a measuring start instruction; and establish request detecting means for detecting a link channel establish request from the subscriber apparatus and transmitting the measuring start instruction to said measuring instruction transmitting means depending on the detection of the link channel establish request.

13. A delay correction system for a wireless telephone system in which a base station apparatus and at least one subscriber apparatus carry out transmitting and receiving operations via respective communication means, in conformance with a time division multiple access (TDMA) system using the base station apparatus as a synchronization reference, said delay correction system comprising:

measuring instruction input means for inputting a delay measuring instruction which instructs a delay measurement;

delay measuring means for measuring a delay quantity between the base station apparatus and the subscriber apparatus; and time slot correcting means, provided in the base station apparatus, for adjusting a time position of a signal received from the subscriber apparatus depending on the delay quantity, and moving the time position of the received signal to an appropriate time slot.

14. The delay correction system as claimed in claim 13, wherein said delay measuring means comprises:

first signal transmitting means, provided in the subscriber apparatus, for transmitting a measuring signal which is used as a reference when measuring the delay quantity, depending on the delay measuring instruction from said measuring instruction input means;

subscriber end measuring signal communicating means, provided in the subscriber apparatus, for exchanging the measuring signal with the base station apparatus;

base station end measuring signal communicating means, provided in the base station apparatus, for exchanging the measuring signal with the subscriber apparatus;

loop-back means, provided in the base station apparatus, for looping back the measured signal which is received via said base station end measuring communicating means after a predetermined time, as a response signal to the subscriber apparatus; and first delay detecting means, provided in the subscriber apparatus, for detecting the delay quantity of the transmission delay between the subscriber apparatus and the base station apparatus, based on an error between a timing at which the response signal should be received and a timing at which the response signal is actually received from said subscriber end measuring signal communicating means, said time slot correcting means receiving the delay information from said base station end measuring signal communicating means, and adjusting the time position of the received signal.

15. The delay correction system as claimed in claim 14, wherein:

said base station end measuring signal communicating means comprises:
  first signal inserting means for securing, as measuring signal transmitting channels, two successive time slots of a transmission period provided by said communication means of the base station apparatus, and transmitting the measuring signal in the measuring signal transmitting channels; and
  first signal separating means for securing, as measuring signal receiving channels, two successive time slots of a reception period provided by said communication means, and separating the signal received in the measuring signal receiving channels,
and said subscriber end measuring signal communicating means comprises:
  second signal inserting means for securing, as measuring signal transmitting channels, two successive time slots of a transmission period provided by said communication means of the subscriber apparatus, and transmitting the measuring signal in the measuring signal transmitting channels; and
  second signal separating means for securing, as measuring signal receiving channels, tow successive time slots of a reception period provided by said communication means, and separating the measuring signal received in the measuring signal receiving channels.

16. The delay correction system as claimed in claim 14, wherein said base station end measuring signal communicating means and said subscriber end measuring signal communicating means communicate the measuring signals using frequency bands which are different from those used by the respective communication means of the other of said base station end measuring signal communicating means and said subscriber end measuring signal communicating means.

17. The delay correction system as claimed in claim 13, wherein said delay measuring means comprises:
  second signal transmitting means, provided in the base station apparatus, for transmitting a measuring signal which is used as s reference when measuring the delay quantity, depending on the delay measuring instruction from said measuring instruction input means;
  base station end measuring signal communicating means, provided in the base station apparatus, for exchanging a measuring signal with the base station apparatus;
  measuring signal respond means, provided in subscriber apparatus, for transmitting the measuring signal to the base station apparatus via said subscriber end measuring signal communicating means in a time slot allocated for the subscriber apparatus; and
  second delay detecting means, provided in the base station apparatus, for detecting the (delay quantity of the transmission delay between the subscriber apparatus and the base station apparatus, based on an error between a timing at which a response signal with respect to the measuring signal should be received and a timing signal at which the response signal is actually transmitted by said measuring signal respond means,
  said time slot correcting means adjusting the time position of the received information, based on the delay quantity detected by said second delay detecting means.

18. The delay correction system as claimed in claim 17, wherein
  said base station end measuring signal communicating means comprises:
    first signal inserting means for securing, as measuring signal transmitting channels, two successive time slots of a transmission period provided by said communications means of the base station apparatus, and transmitting the measuring signal in the measuring signal transmitting channels; and
    first signal separating means for securing, as measuring signal receiving channels, two successive time slots of a reception period provided by said communication means, and separating the signal received in the measuring signal receiving channels,
  and said subscriber end measuring signal communicating means comprises:
    second signal inserting means for securing, as measuring signal transmitting channels, two successive time slots of a transmission period provided by said communication means of the subscriber apparatus, and transmitting the measuring signal in the measuring signal transmitting channels; and
    second signal separating means for securing, as measuring signal receiving channels, two successive time slots of a reception period provided by said communication means, and separating the measuring signal received in the measuring signal receiving channels.

19. The delay correction system as claimed in claim 17, wherein said base station end measuring signal communicating means and said subscriber end measuring signal communicating means communicate the measuring signals using frequency bands which are different from those used by the respective communication means of the other of said base station end measuring signal communicating means and said subscriber end measuring signal communicating means.

20. The delay correction system as claimed in claim 17, wherein said measuring instruction input means comprises:
  measuring instruction transmitting means for transmitting a delay measuring instruction depending on an input of a measuring start instruction; and
  register request detecting means for detecting a position register request from the subscriber apparatus and transmitting the measuring start instruction to said measuring instruction transmitting means in response to the position register request.

21. The delay correction system as claimed in claim 12, wherein said measuring instruction input means comprises:
  measuring instruction transmitting means for transmitting a delay measuring instruction depending on an input of a measuring start instruction; and
  establish request detecting means for detecting a link channel establish request from the subscriber apparatus and transmitting the measuring start instruction to said measuring instruction transmitting means depending upon the detection of the link channel establish request.

22. The delay correction system as claimed in claim 13, wherein said measuring instruction input means comprises:
  measuring instruction transmitting means for transmitting a delay measuring instruction depending on an input of a measuring start instruction; and
  correcting instruction accepting means for accepting an input of a delay correcting instruction and transmitting the measuring start instruction to said measuring instruction transmitting means depending on the acceptance of the delay correcting instruction.

23. A delay correction system for a wireless telephone system in which a base station apparatus and at least one subscriber apparatus carry out transmitting and receiving operations, in conformance with a time division multiple access (TDMA) system using the base station apparatus as a synchronization reference, said subscriber apparatus comprising:

communication means for transmitting and receiving signals with respect to the base station apparatus;

communication control means for controlling the operation of said communication means in conformance with the TDMA system;

second timing adjusting means for receiving transmitting information which is to be sent to the base station apparatus and adjusting a transmission timing depending on and adjusting value which is specified by an input adjusting instruction;

establishment request means for repeatedly instructing said communication control means that a link channel establish request is issued;

transmission timing search means, which starts to operate depending on a transmission of the link channel establish request by said communication control means, for changing the adjusting value depending on whether or not said communication means received a response corresponding to the link channel establish request, and for transmitting the adjusting instruction (which specifies the adjusting value to said second timing adjusting means; and channel allocation monitoring means for monitoring exchange of signals between said communication means and the base station apparatus, and stopping an operation of said establishment request means depending on a detection of a response corresponding to the link channel establish request.

24. A delay correction system for a wireless communication system in which a base station apparatus and at least one subscriber apparatus carry out transmitting and receiving operations via respective communication means, in conformance with a time division multiple access (TDMA) system using the base station apparatus as a synchronization reference, said delay correction system comprising:

a measuring instruction input unit inputting a delay measuring instruction which instructs a delay measurement based on a new registration of a moving of the subscriber apparatus;

a delay measuring unit responsive to the delay measuring instruction, measuring a delay quantity between the base station apparatus and the subscriber apparatus based on a signal received over a control channel; and a timing adjusting unit, provided in the subscriber apparatus, receiving transmitting information which is to be sent to the base station apparatus at an allocated time slot, and adjusting a timing of the transmitting information depending on the delay quantity before sending the transmitting information.

25. The delay correction system as claimed in claim 24, wherein said measuring instruction input unit inputs the delay measuring instruction in response to a position register request or an instruction issued from a maintenance management system which s coupled to the base station apparatus.

26. A delay correction system for a wireless communication system in which a base station apparatus and at least one subscriber apparatus carry out transmitting and receiving operations via respective communication means, in conformance with a time division multiple access (TDMA) system using the base station apparatus as a synchronization reference, said delay correction system comprising:

a measuring instruction input unit inputting a delay measuring instruction which instructs a delay measurement;

a delay measuring unit measuring a delay quantity between the base station apparatus and the subscriber apparatus; and a time slot correcting unit, provided in the base station apparatus, adjusting a time position of a signal received from the subscriber apparatus depending on the delay quantity, and moving the time position of the received signal to an appropriate time slot.

27. A subscriber apparatus for a wireless communication system in which a base station apparatus and at least one subscriber apparatus carry out transmitting and receiving operations, in conformance with a time division multiple access (TDMA) using the base station apparatus as a synchronization reference, said subscriber apparatus comprising:

a communication unit transmitting and receiving signals with respect to the base station apparatus;

a communication control unit controlling the operation of said communication unit in conformance with the TDA system;

a timing adjusting unit receiving transmitting information which is to be sent to the base station apparatus and adjusting a transmission timing depending on an adjusting value which is specified by an input adjusting instruction;

an establishment request unit repeatedly instructing said communication control unit that a link channel establish request is issued;

a transmission timing search unit which starts to operate depending on a transmission of the link channel establish request by said communication control unit, changes the adjusting value depending on whether or not said communication unit received a response corresponding to the link channel establish request, and transmits the adjusting instruction which specifies the adjusting value to said timing adjusting unit; and a channel allocation monitoring unit monitoring exchange of signals between said communication unit and the base station apparatus, and stopping an operation of said establishment request unit depending on a detection of a response corresponding to the link channel establish request.

* * * * *